(12) United States Patent
Nakamura et al.

(10) Patent No.: US 11,668,771 B2
(45) Date of Patent: Jun. 6, 2023

(54) MAGNETIC FIELD MEASUREMENT APPARATUS, MAGNETIC FIELD MEASUREMENT METHOD, AND STORAGE MEDIUM WITH MAGNETIC FIELD MEASUREMENT PROGRAM STORED THEREON

(71) Applicant: Asahi Kasei Microdevices Corporation, Tokyo (JP)

(72) Inventors: Takenobu Nakamura, Tokyo (JP); Shigeki Okatake, Tokyo (JP); Yoshitaka Moriyasu, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 286 days.

(21) Appl. No.: 16/434,192

(22) Filed: Jun. 7, 2019

(65) Prior Publication Data
US 2019/0377035 A1 Dec. 12, 2019

(30) Foreign Application Priority Data

Jun. 8, 2018 (JP) .............................. JP2018-110417
Apr. 11, 2019 (JP) .............................. JP2019-075742

(51) Int. Cl.
*G01R 33/09* (2006.01)
*G01R 33/00* (2006.01)
(Continued)

(52) U.S. Cl.
CPC .............. *G01R 33/09* (2013.01); *A61B 5/242* (2021.01); *A61B 5/243* (2021.01);
(Continued)

(58) Field of Classification Search
CPC ............ G01R 33/0358; G01R 33/0011; G01R 33/0035; G01R 33/0094; G01R 33/0206;
(Continued)

(56) References Cited

U.S. PATENT DOCUMENTS 5,642,045 A 6/1997 Keefe
5,764,061 A 6/1998 Asakawa
(Continued)

FOREIGN PATENT DOCUMENTS

EP 1795864 A1 6/2007
JP H01196586 A 8/1989
(Continued)

OTHER PUBLICATIONS

Koichiro Kobayashi et al. "Development of Biomagnetic Measurement System with 39ch SQUIDs Magnetometer for a Three Dimensional Magnetic Measurement" T.IEE Japan, vol. 118 Issue 11, 1998, pp. 524-531.
(Continued)

*Primary Examiner* — David M Schindler

(57) ABSTRACT

A magnetic field measurement apparatus including a magnetic sensor array having magnetic sensor cells capable of detecting magnetic fields in three axial directions arranged in three dimensions, each magnetic sensor cell including a plurality of magnetic sensors that each have a magnetoresistive element and a magnetic flux concentrator arranged at least at one of one end and another end of the magnetoresistive element; AD converters that respectively convert analog detection signals output by the magnetic sensors into digital measurement data; a magnetic field acquiring section that acquires the digital measurement data; a calibration computing section that calibrates the digital measurement data from the magnetic field acquiring section, using at least one of a main-axis sensitivity, cross-axis sensitivities, and an offset; and a gradient magnetic field computing section that calculates a gradient magnetic field using magnetic field measurement data resulting from the calibration of the digital measurement data.

11 Claims, 15 Drawing Sheets

(51) Int. Cl.
  *A61B 5/243* (2021.01)
  *A61B 5/242* (2021.01)
  *G01R 33/02* (2006.01)
  *G01R 33/035* (2006.01)

(52) U.S. Cl.
  CPC ...... *G01R 33/0011* (2013.01); *G01R 33/0035* (2013.01); *G01R 33/0094* (2013.01); *G01R 33/0206* (2013.01); *A61B 2562/0223* (2013.01); *A61B 2562/046* (2013.01)

(58) Field of Classification Search
  CPC ...... G01R 33/09; G01R 33/07; G01R 33/072; G01R 33/075; G01R 33/077; G01R 33/091; G01R 33/093; G01R 33/095; G01R 33/096; G01R 33/098; A61B 5/242; A61B 5/243; A61B 2562/0223; A61B 2562/046
  See application file for complete search history.

(56) References Cited

U.S. PATENT DOCUMENTS

| | | | | |
|---|---|---|---|---|
| 5,990,679 | A * | 11/1999 | Frommer | G01R 33/022 324/202 |
| 6,376,933 | B1 * | 4/2002 | Goetz | G01R 33/09 307/91 |
| 7,342,399 | B1 * | 3/2008 | Wiegert | G01P 3/66 324/207.11 |
| 7,603,251 | B1 * | 10/2009 | Wiegert | G01V 3/081 702/152 |
| 2001/0026222 | A1 | 10/2001 | Canady | |
| 2003/0011767 | A1 | 1/2003 | Imura | |
| 2004/0155644 | A1 | 8/2004 | Stauth | |
| 2004/0207396 | A1 | 10/2004 | Xiao | |
| 2004/0232912 | A1 | 11/2004 | Akira | |
| 2005/0030018 | A1 | 2/2005 | Shibahara | |
| 2005/0212515 | A1 | 9/2005 | Watanabe | |
| 2006/0031038 | A1 | 2/2006 | Simola | |
| 2006/0055402 | A1 | 3/2006 | Seki | |
| 2006/0066295 | A1 | 3/2006 | Tamura | |
| 2007/0108962 | A1 | 5/2007 | Taulu | |
| 2007/0108975 | A1 | 5/2007 | Desplats | |
| 2008/0161714 | A1 | 7/2008 | Ahonen | |
| 2008/0294386 | A1 | 11/2008 | Taulu | |
| 2009/0069661 | A1 | 3/2009 | Taulu | |
| 2009/0184709 | A1 | 7/2009 | Kajola | |
| 2010/0277163 | A1 * | 11/2010 | Nakamura | G01D 5/145 324/228 |
| 2010/0327862 | A1 | 12/2010 | Nagasaka | |
| 2011/0074406 | A1 * | 3/2011 | Mather | G01R 33/093 324/252 |
| 2011/0241665 | A1 | 10/2011 | Takatsuji | |
| 2012/0105058 | A1 * | 5/2012 | Kopelevitch | G01R 33/093 324/252 |
| 2013/0109954 | A1 | 5/2013 | Simola | |
| 2013/0150702 | A1 | 6/2013 | Hokari | |
| 2013/0165766 | A1 | 6/2013 | Nishikawa | |
| 2014/0111197 | A1 | 4/2014 | Lortie | |
| 2014/0257104 | A1 | 9/2014 | Dunbar | |
| 2014/0343882 | A1 | 11/2014 | Taulu | |
| 2015/0070008 | A1 * | 3/2015 | Motz | G01R 33/07 324/251 |
| 2015/0145625 | A1 | 5/2015 | Fukasawa | |
| 2015/0168176 | A1 * | 6/2015 | Wu | G01C 17/38 702/150 |
| 2015/0253412 | A1 | 9/2015 | Jost | |
| 2016/0037277 | A1 | 2/2016 | Matsumoto | |
| 2016/0041006 | A1 | 2/2016 | Ausserlechner | |
| 2016/0338608 | A1 | 11/2016 | Nagasaka | |
| 2017/0090003 | A1 | 3/2017 | Guo | |
| 2017/0100051 | A1 | 4/2017 | Honkura | |
| 2017/0212188 | A1 | 7/2017 | Kikitsu | |
| 2017/0219661 | A1 | 8/2017 | Hata | |
| 2017/0299662 | A1 | 10/2017 | Nagasaka | |
| 2017/0299663 | A1 | 10/2017 | Nagasaka | |
| 2018/0014738 | A1 | 1/2018 | Tanaka | |
| 2018/0193728 | A1 | 7/2018 | Bashkirov | |
| 2018/0242865 | A1 | 8/2018 | Yamagata | |
| 2018/0284310 | A1 | 10/2018 | Kawano | |
| 2019/0079141 | A1 * | 3/2019 | Marauska | G01D 3/08 |
| 2020/0326399 | A1 * | 10/2020 | Yoshida | H01L 24/48 |
| 2021/0161420 | A1 * | 6/2021 | Nakamura | A61B 5/05 |
| 2021/0286023 | A1 * | 9/2021 | Okatake | G01R 33/0206 |
| 2022/0065953 | A1 * | 3/2022 | Tsuji | G01R 33/0017 |

FOREIGN PATENT DOCUMENTS

| | | |
|---|---|---|
| JP | H03200083 A | 9/1991 |
| JP | H05232202 A | 9/1993 |
| JP | H09243725 A | 9/1997 |
| JP | 2000051169 A | 2/2000 |
| JP | 2000217798 A | 8/2000 |
| JP | 2000284032 A | 10/2000 |
| JP | 2001083224 A | 3/2001 |
| JP | 2001087237 A | 4/2001 |
| JP | 2002272695 A | 9/2002 |
| JP | 2003199723 A | 7/2003 |
| JP | 2004271303 A | 9/2004 |
| JP | 2005049179 A | 2/2005 |
| JP | 2005195376 A | 7/2005 |
| JP | 2005217341 A | 8/2005 |
| JP | 2006047080 A | 2/2006 |
| JP | 2007285865 A | 11/2007 |
| JP | 2008032562 A | 2/2008 |
| JP | 2008142154 A | 6/2008 |
| JP | 2011047910 A | 3/2011 |
| JP | 2011220977 A | 11/2011 |
| JP | 2012152514 A | 8/2012 |
| JP | 2012152515 A | 8/2012 |
| JP | 2013217690 A | 10/2013 |
| JP | 2014134388 A | 7/2014 |
| JP | 2014153054 A | 8/2014 |
| JP | 2014153309 A | 8/2014 |
| JP | 2015075465 A | 4/2015 |
| JP | 2016183944 A | 10/2016 |
| JP | 2017003312 A | 1/2017 |
| JP | 2017026312 A | 2/2017 |
| JP | 2017062122 A | 3/2017 |
| JP | 6153387 B2 | 6/2017 |
| JP | 2017133933 A | 8/2017 |
| JP | 2017166921 A | 9/2017 |
| JP | 2018004618 A | 1/2018 |
| JP | 2018054461 A | 4/2018 |
| WO | 03046587 A1 | 6/2003 |
| WO | 2005030051 A1 | 4/2005 |
| WO | 2017209273 A1 | 12/2017 |

OTHER PUBLICATIONS

International Search Report and (ISA/237) Written Opinion of the International Search Authority for International Patent Application No. PCT/JP2019/032548, mailed by the Japan Patent Office dated Oct. 21, 2019.
(ISA/237) Written Opinion of the International Search Authority for International Patent Application No. PCT/JP2019/050826, mailed by the Japan Patent Office dated Mar. 17, 2020.
Office Action issued for counterpart Japanese Application No. 2018-157607, issued by the Japanese Patent Office dated Oct. 23, 2018 (dated Oct. 12, 2018).
Office Action issued for counterpart Japanese Application No. 2018-157607, issued by the Japanese Patent Office dated Jan. 29, 2019 (dated Jan. 23, 2019).
Samu Taulu et al., "Presentation of electromagnetic multichannel data: The signal space separation method", Journal of Applied Physics 97, 124905 (2005), pp. 124905-1-10.
Kensuke Sekihara, "Signal Space Separation Method for a Biomagnetic Sensor Array Arranged on a Flat Plane for Magnetocardiographic Applications: A Computer Simulation Study", Journal of Healthcare Engineering Volume 2018, Article ID 7689589, pp. 1-19, https://doi.org/10.1155/2018/7689589.

(56) References Cited

OTHER PUBLICATIONS

Samu Taulu et al., "Applications of the Signal Space Separation Method", IEEE Transactions on Signal Processing, vol. 53, No. 9, Sep. 2005, pp. 3359-3372.
Office Action issued for counterpart U.S. Appl. No. 16/365,689, issued by the US Patent and Trademark Office dated Sep. 29, 2022.
Hu Chao et al., "A cubic 3-axis magnetic sensor array for wirelessly tracking magnet position and orientation." IEEE Sensors Journal 10.5 (2010): 903-913. (Year: 2010).
Three-Axis Magnetic Sensor H MC 1043 Datasheet (Year: 2012), Aug. 2012.
Office Action issued for counterpart U.S. Appl. No. 16/365,689, issued by the US Patent and Trademark Office dated Mar. 7, 2022.
Office Action issued for counterpart U.S. Appl. No. 16/809,502, issued by the US Patent and Trademark Officed dated Apr. 26, 2022.

* cited by examiner

MAGNETIC FIELD MEASUREMENT APPARATUS, MAGNETIC FIELD MEASUREMENT METHOD, AND STORAGE MEDIUM WITH MAGNETIC FIELD MEASUREMENT PROGRAM STORED THEREON The contents of the following Japanese patent application(s) are incorporated herein by reference:
2018-110417 filed in JP on Jun. 8, 2018
2019-075742 filed in JP on Apr. 11, 2019

BACKGROUND

1. Technical Field

The present invention relates to a magnetic field measurement apparatus, a magnetic field measurement method, and a storage medium with a magnetic field measurement program stored thereon.

2. Related Art

A conventional biomagnetic field measurement apparatus is known that uses a fluxmeter in which superconducting quantum interference devices (SQUIDs) are arranged in a two-dimensional array, as shown in Patent Document 1, for example.
Patent Document 1: Japanese Patent Application Publication No. 2008-142154

A conventional fluxmeter is configured to measure either a magnetic field component in a Z direction perpendicular to an XY plane oriented substantially along a body surface of a biomagnetic field generated from a living body, or a magnetic field component in the X direction and a magnetic field component in the Y direction. However, in order to more accurately examine a living body, a magnetic field measurement apparatus is desired that can obtain a more detailed gradient magnetic field distribution.

SUMMARY

In order to solve the above problem, according to a first aspect of the present invention, provided is a magnetic field measurement apparatus. The magnetic field measurement apparatus may comprise a magnetic sensor array having a plurality of magnetic sensor cells capable of detecting magnetic fields in three axial directions arranged in three dimensions, each magnetic sensor cell including a plurality of magnetic sensors that each have a magnetoresistive element and a magnetic flux concentrator arranged at least at one of one end and another end of the magnetoresistive element. The magnetic field measurement apparatus may comprise a plurality of AD converters that respectively convert analog detection signals output by the plurality of magnetic sensors into digital measurement data. The magnetic field measurement apparatus may comprise a magnetic field acquiring section that acquires the digital measurement data. The magnetic field measurement apparatus may comprise a calibration computing section that calibrates the digital measurement data from the magnetic field acquiring section, using at least one of a main-axis sensitivity, cross-axis sensitivities, and an offset. The magnetic field measurement apparatus may comprise a gradient magnetic field computing section that calculates a gradient magnetic field using magnetic field measurement data resulting from the calibration of the digital measurement data. The gradient magnetic field computing section may calculate the gradient magnetic field in three dimensions for magnetic fields in all three axial directions, by calculating a difference in magnetic fields between adjacent magnetic sensor cells among the plurality of magnetic sensor cells, using the magnetic field measurement data measured between the adjacent magnetic sensor cells.

The three axial directions and directions in which of the three dimensions the magnetic sensor cells are arranged may be the same.

The gradient magnetic field computing section may calculate the gradient magnetic field that is second-order or higher, using the measurement data measured between a plurality of pairs of the adjacent magnetic sensor cells.

The gradient magnetic field computing section may calculate a difference in the magnetic fields between the adjacent magnetic sensor cells, using the measurement data measured between the adjacent magnetic sensor cells.

The plurality of magnetic sensor cells may each include a plurality of sensor sections that each include the magnetic sensor and a coil. The plurality of sensor sections may be arranged in a manner to not overlap with each other when viewed from each of the three dimensional directions.

The plurality of sensor sections may each be arranged such that one end is provided at a gap located between the plurality of sensor sections and another end extends away from the gap in a corresponding axial direction among the three axial directions.

The magnetic field measurement apparatus may further comprise a malfunction determining section that determines a malfunction of the magnetic sensor array, based on the gradient magnetic field calculated by the gradient magnetic field computing section.

The malfunction determining section may calculate a value indicating rotation of the magnetic field at a position of any magnetic sensor cell among the plurality of magnetic sensor cells, based on the gradient magnetic field, and determine that the magnetic sensor array is malfunctioning if the value indicating the rotation of the magnetic field is greater than or equal to a first threshold value.

The malfunction determining section may calculate a value indicating divergence of the magnetic field at a position of any magnetic sensor cell among the plurality of magnetic sensor cells, based on the gradient magnetic field, and determine that the magnetic sensor array is malfunctioning if the value indicating the divergence of the magnetic field is greater than or equal to a second threshold value.

The calibration computing section may perform a computation to align orientations of the plurality of magnetic sensor cells.

According to a second aspect of the present invention, provided is a magnetic field measurement method for measuring a magnetic field with a magnetic field measurement apparatus. The magnetic field measurement method may comprise converting, with the magnetic field measurement apparatus, analog detection signals output respectively by a plurality of magnetic sensors, in a magnetic sensor array having a plurality of magnetic sensor cells capable of detecting magnetic fields in three axial directions arranged in three dimensions, with each magnetic sensor cell including a plurality of the magnetic sensors that each have a magnetoresistive element and a magnetic flux concentrator arranged at least at one of one end and another end of the magnetoresistive element, into digital measurement data. The magnetic field measurement method may comprise acquiring the digital measurement data. The magnetic field measurement method may comprise calibrating the digital measurement data using at least one of a main-axis sensitivity, cross-axis sensitivities, and an offset. The magnetic field measurement method may comprise calculating a gradient magnetic field using magnetic field measurement data resulting from the calibration of the digital measurement data. The calculating the gradient magnetic field may include calculating the gradient magnetic field in three dimensions for magnetic fields in all three axial directions, by calculating a difference in magnetic fields between adjacent magnetic sensor cells among the plurality of magnetic sensor cells, using the magnetic field measurement data measured between the adjacent magnetic sensor cells.

According to a third aspect of the present invention, provided is a storage medium storing thereon a magnetic field measurement program. The magnetic field measurement program may be executed by a computer. The magnetic field measurement program may cause the computer to function as a plurality of AD converters that respectively convert analog detection signals output by a plurality of magnetic sensors into digital measurement data, the plurality of magnetic sensors being in a magnetic sensor array having a plurality of magnetic sensor cells capable of detecting magnetic fields in three axial directions arranged in three dimensions, each magnetic sensor cell including a plurality of the magnetic sensors that each have a magnetoresistive element and a magnetic flux concentrator arranged at least at one of one end and another end of the magnetoresistive element. The magnetic field measurement program may cause the computer to function as a magnetic field acquiring section that acquires the digital measurement data. The magnetic field measurement program may cause the computer to function as a calibration computing section that calibrates the digital measurement data from the magnetic field acquiring section, using at least one of a main-axis sensitivity, cross-axis sensitivities, and an offset. The magnetic field measurement program may cause the computer to function as a gradient magnetic field computing section that calculates a gradient magnetic field using magnetic field measurement data resulting from the calibration of the digital measurement data, and that calculates the gradient magnetic field in three dimensions for magnetic fields in all three axial directions, by calculating a difference in magnetic fields between adjacent magnetic sensor cells among the plurality of magnetic sensor cells, using the magnetic field measurement data measured between the adjacent magnetic sensor cells.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
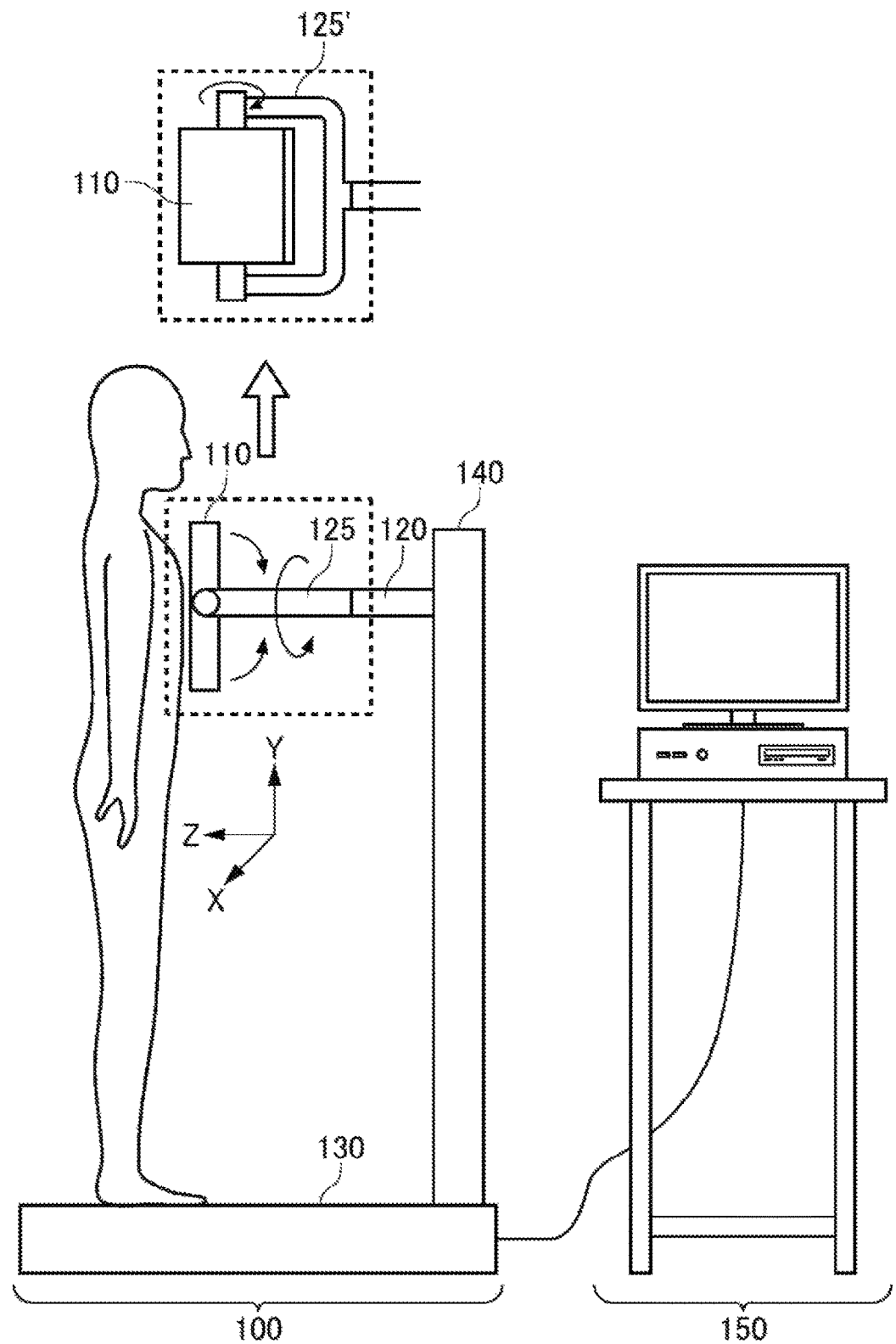
FIG. 1 shows a configuration of a magnetic field measurement apparatus 10 according to the present embodiment.

FIG. 1 shows a configuration of a magnetic field measurement apparatus 10 according to the present embodiment. The magnetic field measurement apparatus 10 measures a magnetic field using a magnetoresistive element. The magnetic field measurement apparatus 10 is an example of a magnetocardiography measurement apparatus, and measures the magnetic field generated by the electrical activity of a human heart (referred to as a "heart magnetic field"). Instead, the magnetic field measurement apparatus 10 may be used to measure the heart magnetism of a living body that is not human, or to measure biomagnetic fields other than a heart magnetic field, such as a brain magnetic field. Furthermore, the magnetic field measurement apparatus 10 may be used for magnetic flaw examinations to detect flaws or the like on or below the surface of steel material or welded portions.

The magnetic field measurement apparatus 10 includes a body portion 100 and an information processing section 150. The body portion 100 is a component for sensing the heart magnetism of a subject, and includes a magnetic sensor unit 110, a head 120, a drive section 125, a base portion 130, and a pole portion 140.

The magnetic sensor unit 110 is arranged at a position facing the heart on the chest of the subject when measuring the heart magnetism, and senses the heart magnetism of the subject. The head 120 supports the magnetic sensor unit 110, and causes the magnetic sensor unit 110 to face the subject. The drive section 125 is provided between the magnetic sensor unit 110 and the head 120, and changes the orientation of the magnetic sensor unit 110 relative to the head 120 when calibration is performed. The drive section 125 according to the present embodiment includes a first actuator that can rotate the magnetic sensor unit 110 by 360 degrees on the Z-axis in the drawing and a second actuator that rotates the magnetic sensor unit 110 on an axis perpendicular to the Z-axis (the X-axis in the state shown in the drawing), and the drive section 125 uses these actuators to change the azimuth angle and zenith angle of the magnetic sensor unit 110. Here, for example, the azimuth angle of the magnetic sensor unit 110 may be an angle by which a plane of the magnetic sensor unit 110 rotates about an axis (the Z axis in the figure) coinciding with the direction of zenith which is defined as the direction pointing to the chest of a subject, and the zenith angle of the magnetic sensor unit 110 may be an angle that the plane of the magnetic sensor unit 110 forms with the axis coinciding with the direction of zenith. As shown in the drawing, the drive section 125 is Y-shaped as seen from the Y-axis direction in the drawing, and the second actuator can rotate the magnetic sensor unit 110 360 degrees on the X-axis in the drawing.

The base portion 130 is a pedestal that supports other components, and is a pedestal on which the subject is placed during the heart magnetism measurement, in the present embodiment. The pole portion 140 supports the head 120 at the height of the chest of the subject. The pole portion 140 may be capable of extending and contracting in an up-down direction to adjust the height of the magnetic sensor unit 110 to the height of the chest of the subject.

The information processing section 150 is a component for processing and outputting measurement data obtained by the body portion 100, via display, printing, or the like. The information processing section 150 may be a computer such as a PC (personal computer), tablet computer, smartphone, work station, server computer, or general use computer, or may be a computer system in which a plurality of computers are connected. Instead, the information processing section 150 may be a specialized computer designed for information processing of the heart magnetism measurement, or may be specialized hardware realized by specialized circuitry.

Figure 2:
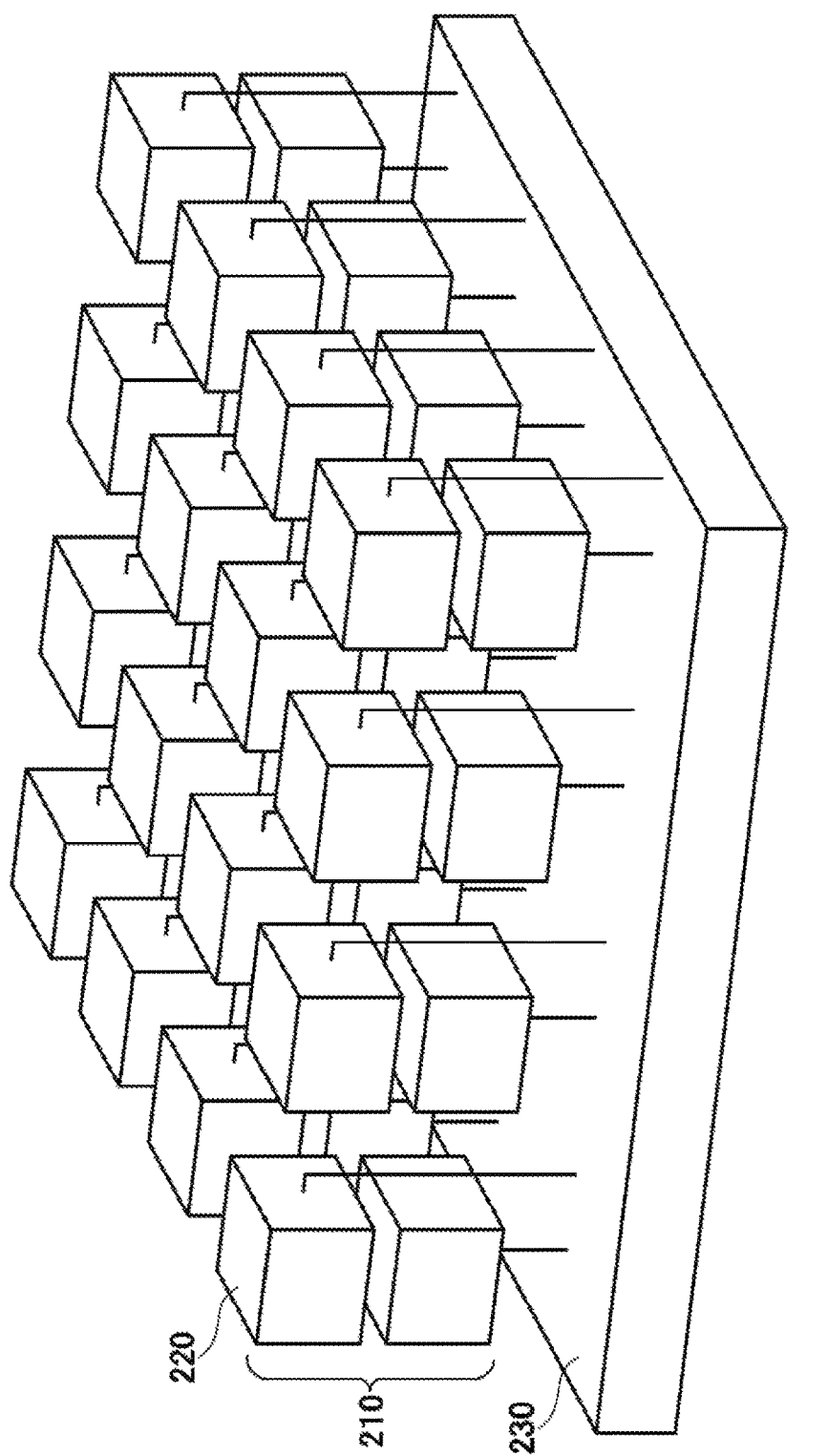
FIG. 2 shows a configuration of the magnetic sensor unit 110 according to the present embodiment.

FIG. 2 shows a configuration of the magnetic sensor unit 110 according to the present embodiment. The magnetic sensor unit 110 includes a magnetic sensor array 210 and a sensor data collecting section 230. The magnetic sensor array 210 is formed by a plurality of magnetic sensor cells 220 that are arranged three-dimensionally and are each capable of detecting a magnetic field in three axial directions, and each magnetic sensor cell 220 includes a plurality of magnetoresistive elements. In the present drawing, the magnetic sensor array 210 includes four magnetic sensor cells 220 in the X direction, four magnetic sensor cells 220 in the Y direction, and two magnetic sensor cells 220 in the Z direction.

The sensor data collecting section 230 is electrically connected to the plurality of magnetic sensor cells 220 included in the magnetic sensor array 210, collects the sensor data (detection signals) from the plurality of magnetic sensor cells 220, and supplies the sensor data to the information processing section 150.

Figure 3:
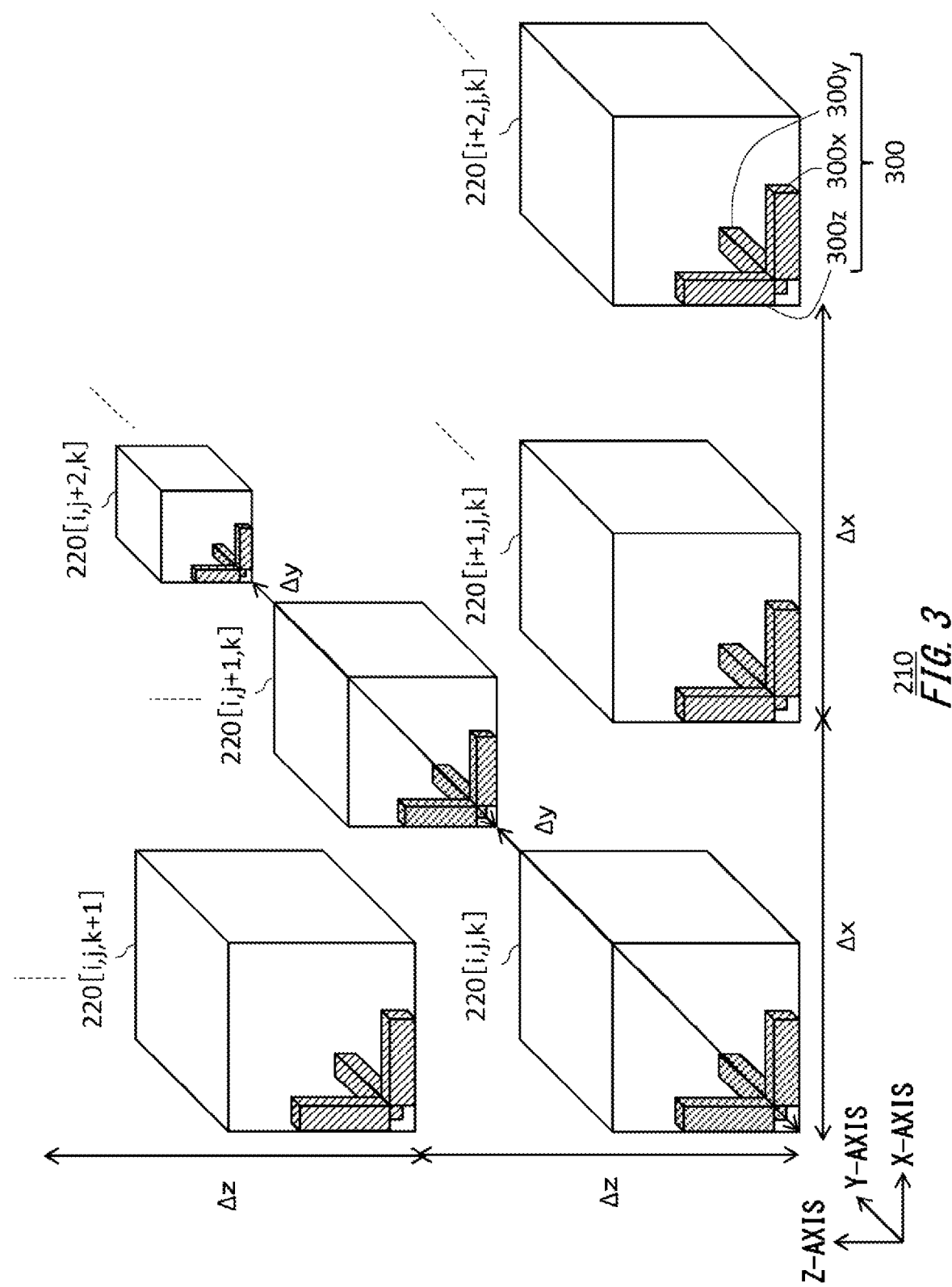
FIG. 3 shows a configuration and arrangement of the magnetic sensor cells 220 in the magnetic sensor array 210 according to the present embodiment.

FIG. 3 shows a configuration and arrangement of the magnetic sensor cells 220 in the magnetic sensor array 210 according to the present embodiment. Each magnetic sensor cell 220 includes a plurality of sensor sections 300x to 300z (collectively referred to below as the "sensor sections 300") that each have a magnetoresistive element. In the present embodiment, the sensor section 300x is arranged in the X-axis direction and is capable of detecting a magnetic field in the X-axis direction. The sensor section 300y is arranged in the Y-axis direction and is capable of detecting a magnetic field in the Y-axis direction. The sensor section 300z is arranged in the Z-axis direction and is capable of detecting a magnetic field in the Z-axis direction.

The plurality of magnetic sensor cells 220 are arranged at regular intervals of $\Delta x$ in the X-axis direction, $\Delta y$ in the Y-axis direction, and $\Delta z$ in the Z-axis direction. The position of each magnetic sensor cell 220 in the magnetic sensor array 210 is expressed by j, which is a set of a position i in the X direction, a position j in the Y direction, and a position k in the Z direction. Here, i is an integer that satisfies $0 \leq i \leq Nx-1$ (where Nx is the number of magnetic sensor cells 220 arranged in the X direction), j is an integer that satisfies $0 \leq j \leq Ny-1$ (where Ny is the number of magnetic sensor cells 220 arranged in the Y direction), and k is an integer that satisfies $0 \leq k \leq Nz-1$ (where Nz is the number of magnetic sensor cells 220 arranged in the Z direction).

In the present drawing, the three axial directions of the magnetic fields detected by the sensor sections 300x, 300y, and 300z are the same as the three-dimensional directions in which the magnetic sensor cells 220 are arranged. Therefore, it is easy to understand each component of the gradient magnetic field in the distribution diagram of the gradient magnetic field shown further below. Furthermore, the sensor sections 300x, 300y, and 300z are arranged in each magnetic sensor cell 220 in a manner to not overlap with each other when viewed from each of the three dimensional directions in which the magnetic sensor cells 220 are arranged. Furthermore, in the present drawing, the sensor sections 300x, 300y, and 300z are each arranged to have one end provided on a side of a gap provided between the plurality of sensor sections 300 and to have another end that extends away from the gap in the respective axial direction among the three axial directions. The present drawing shows an example in which gaps are provided at the lower left corners of the magnetic sensor cells 220 as seen in a front view, and the sensor sections 300x, 300y, and 300z are each arranged to have one end provided in contact with the gap and the other end extending away from the gap in the respective axial direction among the X-axis, Y-axis, and Z-axis directions. In the present drawing, the sensor sections 300x, 300y, and 300z are arranged along three edges that are perpendicular to each other from one corner in each cube shaped magnetic sensor cell 220, and the gap is provided in this corner. Furthermore, the coils and magnets of the sensor sections 300x, 300y, and 300z described further below are preferably arranged to not overlap with each other. In this way, the measurement points can be made clear, and it becomes even easier to understand each component of the gradient magnetic field. Furthermore, the cross-axes sensitivities of the sensor sections 300x, 300y, and 300z can be treated as being equivalent to each other. The cross-axis sensitivities are caused by interference between the coils or magnets of the sensor sections 300x, 300y, and 300z. However, the three axial directions of magnetic fields that are detected and the three dimensional directions in which the magnetic sensor cells 220 are arranged may be different. If these directions are different, there are no restrictions on the arrangement of the sensor sections 300 within the magnetic sensor cells 220 and the arrangement directions of the magnetic sensor cells 220, and the degree of design freedom for the magnetic sensor array 210 can be increased.

Figure 4:
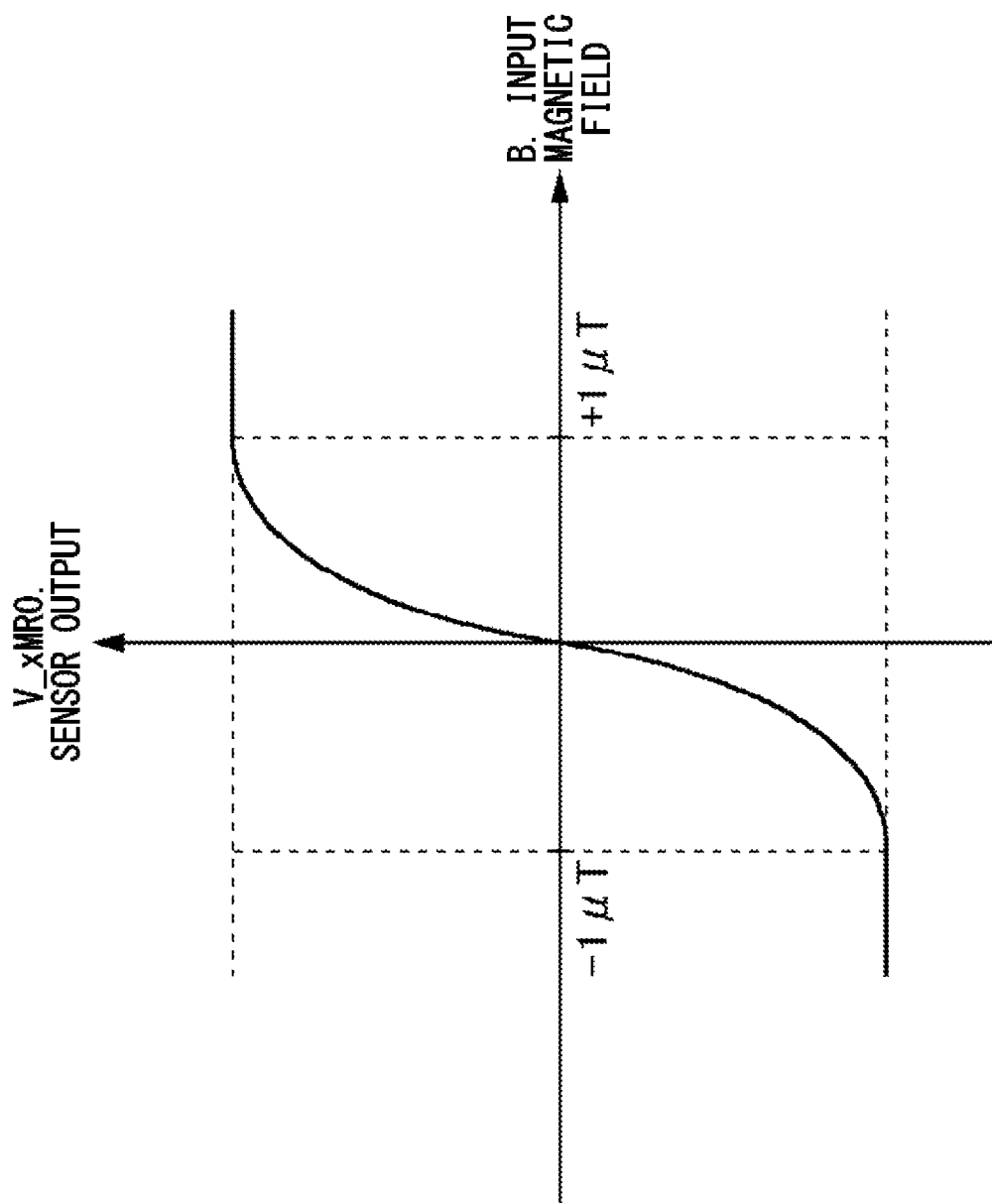
FIG. 4 shows an example of input/output characteristics of a magnetic sensor of a magnetoresistive element according to the present embodiment.

FIG. 4 shows an example of input/output characteristics of a magnetic sensor of a magnetoresistive element according to the present embodiment. In the present drawing, the horizontal axis indicates the magnitude B of the input magnetic field that is input to the magnetic sensor, and the vertical axis indicates the magnitude V_xMR0 of the detection signal of the magnetic sensor. The magnetic sensor includes a giant magneto-resistance (GMR) element, a tunnel magneto-resistance element (TMR), or the like, for example, and detects the magnitude of the magnetic field in a predetermined axial direction.

This type of magnetic sensor has high magnetic sensitivity, which is the slope of the detection signal V_xMR0 relative to the input magnetic field B, and can detect very small magnetic fields of approximately 10 pT. On the other hand, the magnetic sensor has its detection signal V_xMR0 saturated when the absolute value of the input magnetic field B is approximately 1 for example, and has a narrow range in which the linearity of the input/output characteristic is favorable. Therefore, when a closed loop for generating a feedback magnetic field is added to such a magnetic sensor, it is possible to improve the linearity of the magnetic sensor. The following describes such a magnetic sensor.

Figure 5:
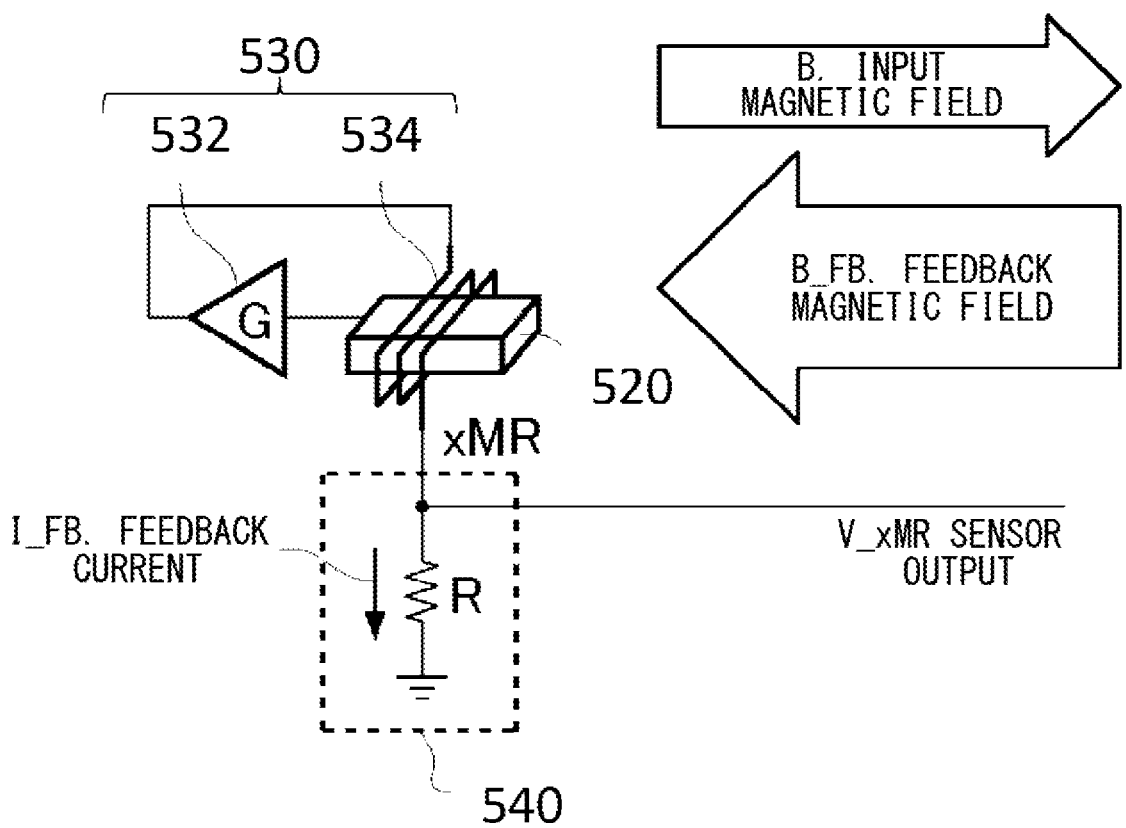
FIG. 5 shows an example of a configuration of a sensor section 300 according to the present embodiment.

FIG. 5 shows an example of a configuration of a sensor section 300 according to the present embodiment. A sensor section 300 is provided within each of the plurality of magnetic sensor cell 220, and each sensor section 300 includes a magnetic sensor 520, a magnetic field generating section 530, and an output section 540. A portion of the sensor section 300, e.g. an amplification circuit 532 and the output section 540, may be provided on the sensor data collecting section 230 side instead of the magnetic sensor cell 220 side.

The magnetic sensor 520 includes a magnetic resistance effect element such as a GMR element or TMR element, in the same manner as the magnetic sensor described in FIG. 4. The magnetic sensor 520 may be formed such that, in a case where the positive direction of the magnetically sensitive axis is the +X direction, the resistance value increases when a magnetic field in the +X direction is input and the resistance value decreases when a magnetic field in the −X direction is input. In other words, by observing the change of the resistance value of the magnetic sensor 520, it is possible to detect the magnitude of the magnetic field B input to this magnetic sensor 520. For example, with S representing the magnetic sensitivity of the magnetic sensor 520, the result of the detection of the input magnetic field B of the magnetic sensor 520 can be calculated as S×B. As an example, the magnetic sensor 520 is connected to a power source or the like, and outputs a voltage drop corresponding to the change of the resistance value, as the input magnetic field detection result.

The magnetic field generating section 530 provides the magnetic sensor 520 with a feedback magnetic field that reduces the input magnetic field detected by the magnetic sensor 520. For example, the magnetic field generating section 530 operates to generate a feedback magnetic field B_FB that has the opposite orientation of the magnetic field B input to the magnetic sensor 520 and an absolute value that is substantially the same as this input magnetic field, to cancel out the input magnetic field. The magnetic field generating section 530 includes an amplification circuit 532 and a coil 534.

The amplification circuit 532 outputs a current corresponding to the detection result of the input magnetic field by the magnetic sensor 520, as a feedback current I_FB. For example, the amplification circuit 532 includes a transconductance amplifier, and outputs the feedback current I_FB corresponding to the output voltage of the magnetic sensor 520. As an example, with G representing a voltage-current conversion coefficient of the amplification circuit 532, the feedback current I_FB can be calculated as G×S×B.

The coil 534 generates a feedback magnetic field B_FB corresponding to the feedback current I_FB. The coil 534 preferably generates the feedback magnetic field B_FB to be uniform across the entire magnetic sensor 520. As an example, with β representing a coil coefficient of the coil 534, the feedback magnetic field B_FB can be calculated as β×I_FB. Here, since the feedback magnetic field B_FB is generated with a direction for cancelling out the input magnetic field B, the magnetic field input to the magnetic sensor 520 is reduced to B-B_FB. Accordingly, the feedback current I_FB is expressed as shown in the expression below.

$$I\_FB = G \times S \times (B - \beta \times I\_FB) \quad \text{Expression 1:}$$

By solving Expression 1 for the feedback current I_FB, it is possible to calculate the value of the feedback current I_FB in the regular state of the sensor sections 300. When the magnetic sensitivity S of the magnetic sensor 520 and the voltage-current conversion coefficient G of the amplification circuit 532 are large enough, the expression shown below can be calculated from Expression 1.

$$I\_FB = \frac{G \times S \times B}{1 + G \times S \times \beta} \cong \frac{B}{\beta} \quad \text{Expression 2}$$

The output section 540 outputs the output signal V_xMR corresponding to the feedback current I_FB in order for the magnetic field generating section 530 to generate the feedback magnetic field B_FB. For example, the output section 540 includes a resistance element with a resistance value R, and outputs the voltage drop caused by the feedback current I_FB flowing through this resistance element, as the output signal V_xMR. In this case, the output signal V_xMR is calculated as shown in the expression below, according to Expression 2.

$$V\_xMR = R \times I\_FB = \frac{R \times B}{\beta} \quad \text{Expression 3}$$

As shown above, each sensor section 300 generates a feedback magnetic field that reduces the magnetic field input from the outside, and therefore substantially reduces the magnetic field input to the magnetic sensor 520. Therefore, the sensor section 300 uses a magnetoresistive element having the characteristic shown in FIG. 4 as the magnetic sensor 520, and can prevent the detection signal V_xMR from becoming saturated even when the absolute value of the input magnetic field B exceeds 1 μT. The following describes the input/output characteristic of such a sensor section 300.

Figure 6:
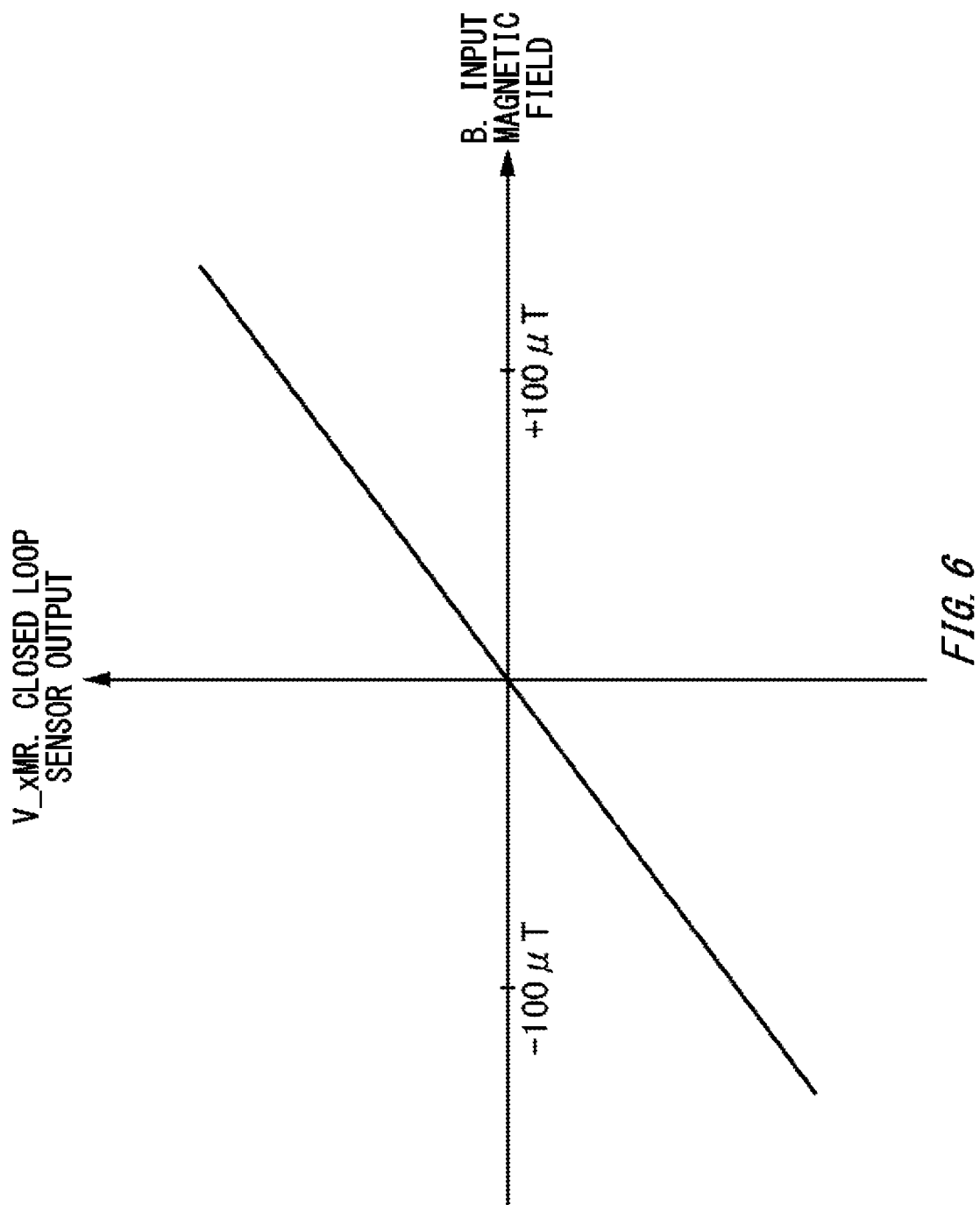
FIG. 6 shows an example of an input/output characteristic of a sensor section 300 according to the present embodiment.

FIG. 6 shows an example of an input/output characteristic of a sensor section 300 according to the present embodiment. In the present drawing, the horizontal axis indicates the magnitude B of the input magnetic field that is input to the sensor section 300, and the vertical axis indicates the magnitude V_xMR of the detection signal of the sensor section 300. The sensor section 300 has high magnetic sensitivity, and can detect a very small magnetic field of approximately 10 pT. Furthermore, the sensor section 300 can maintain favorable linearity for the detection signal V_xMR, even when the absolute value of the input magnetic field B exceeds 100 µT, for example.

In other words, the sensor section 300 according to the present embodiment is configured such that the detection result maintains linearity with respect to the input magnetic field B, when the input magnetic field B is in a predetermined range where the absolute value of the input magnetic field B is less than or equal to hundreds of microteslas, for example. By using such a sensor section 300, it is possible to easily detect a very weak magnetic signal, such as the heart magnetism signal, for example.

Figure 7:
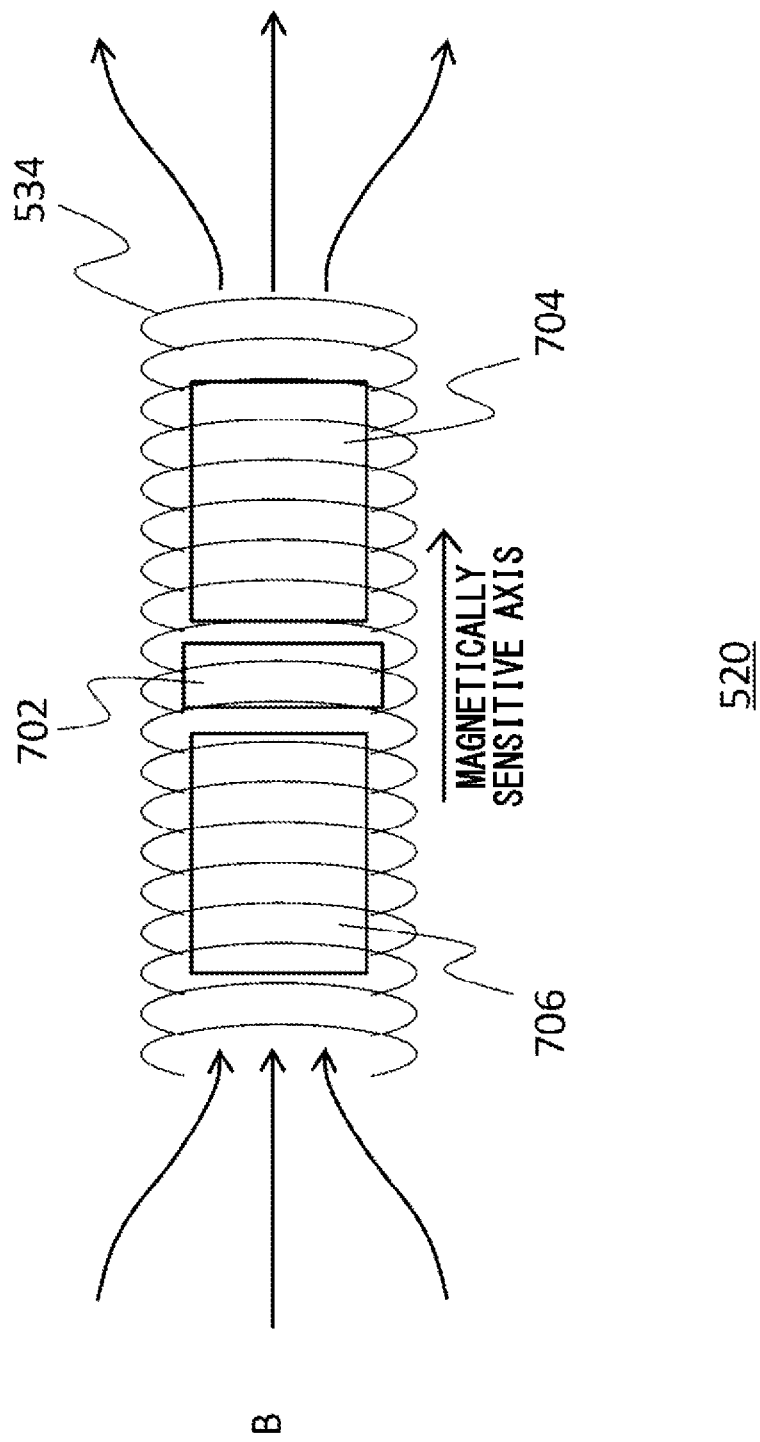
FIG. 7 shows an example of a configuration of a magnetic sensor 520 according to the present embodiment.

FIG. 7 shows an example of a configuration of a magnetic sensor 520 according to the present embodiment. As an example, the magnetic sensor 520 according to the present embodiment includes a magnetoresistive element 702 and magnetic flux concentrators 704 and 706 arranged respectively at one end and the other end of the magnetoresistive element 702. The magnetic flux concentrators 704 and 706 are arranged in a manner to sandwich the magnetoresistive element 702 therebetween. In the front view of FIG. 7, the magnetic flux concentrator 704 arranged at the right end of the magnetoresistive element 702 along the magnetically sensitive axis is the magnetic flux concentrator provided on the positive side of the magnetically sensitive axis, and the magnetic flux concentrator 706 arranged on the left at the left end of the magnetoresistive element 702 is the magnetic flux concentrator provided on the negative side of the magnetically sensitive axis. The resistance of the magnetoresistive element 702 may increase or decrease when a magnetic field oriented from the negative side to the positive side of the magnetically sensitive axis is input to the magnetic flux concentrators 704 and 706. The magnetically sensitive axis may be arranged along the direction of magnetization that is fixed by the fixed magnetization layer forming the magnetoresistive element 702. The magnetic flux concentrators 704 and 706 are formed by a soft magnetic material such as iron. By arranging the magnetic flux concentrators 704 and 706 formed by the soft magnetic material respectively at the one end and the other end of the magnetoresistive element 702, it is possible to increase the magnetic force lines passing through the magnetoresistive element 702, thereby making it possible to increase the sensitivity of the magnetic sensor 520.

In the present drawing, an example is shown in which the magnetic flux concentrators are provided respectively at the one end and the other end of the magnetoresistive element 702, but instead, a magnetic flux concentrator may be provided at only the one end or only the other end of the magnetoresistive element 702. However, in order to further increase the sensitivity of the magnetic sensor 520, magnetic flux concentrators are preferably provided at both the one end and the other end of the magnetoresistive element 702.

Figure 8:
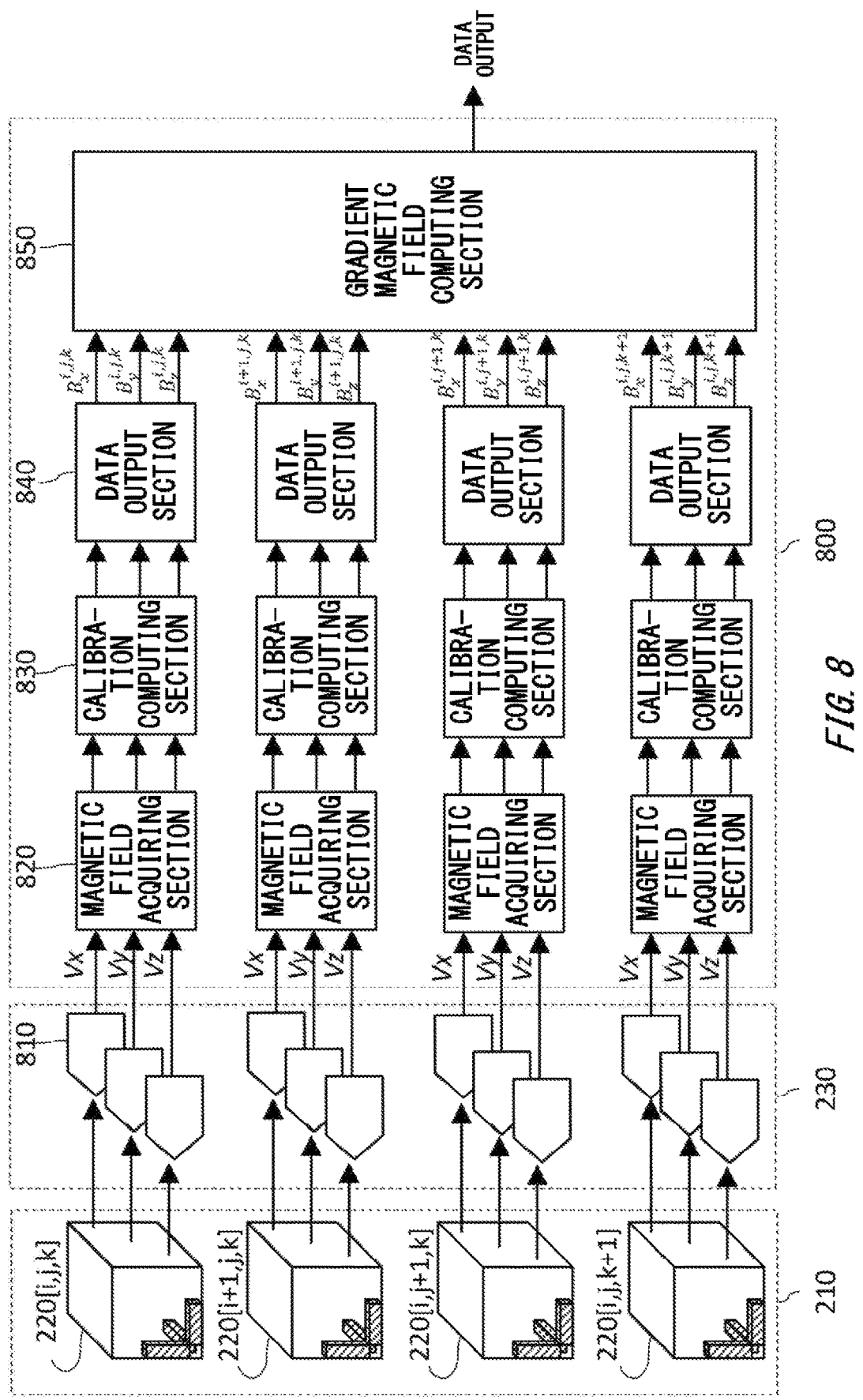
FIG. 8 shows a configuration of the magnetic sensor array 210, the sensor data collecting section 230, and a sensor data processing section 800 according to the present embodiment.

FIG. 8 shows a configuration of the magnetic sensor array 210, the sensor data collecting section 230, and a sensor data processing section 800 according to the present embodiment.

The magnetic sensor array 210 includes a plurality of magnetic sensor cells 220. The plurality of magnetic sensor cells 220 each include the plurality of sensor sections 300x to 300z, as described above. The present drawing shows, among the plurality of magnetic sensor cells 220 oriented in the respective dimensional directions included in the magnetic sensor array 210, a portion relating to the calculation of a first order gradient magnetic field at [i, j, k], i.e. a portion relating to [i, j, k], [i+1, j, k], [i, j+1, k], and [i, j, k+1].

The sensor data collecting section 230 includes a plurality of AD converters 810. The plurality of AD converters 810 are provided to correspond respectively to the plurality of sensor sections 300x to 300z of the magnetic sensor cells 220, and each AD converter 810 converts the analog detection signal (the sensor output signal V_xMR of FIG. 6) output by the corresponding sensor section 300 into digital measurement data (Vx, Vy, or Vz). Here, Vx, Vy and Vz are measurement values (e.g. digital values representing sensor output signal voltages) obtained by digitally converting the detection signals from the sensor sections 300x, 300y, and 300z.

The sensor data processing section 800 includes a plurality of magnetic field acquiring sections 820, a plurality of calibration computing sections 830, and a plurality of data output sections 840 corresponding respectively to the plurality of magnetic sensor cells 220, and also includes a gradient magnetic field computing section 850.

Each magnetic field acquiring section 820 is connected to three AD converters 810 that are connected to the corresponding magnetic sensor cell 220, and acquires the measurement data measured by each of the sensor sections 300x to 300z in this magnetic sensor cell 220, among the magnetic sensor cells 220 forming the magnetic sensor array 210. Specifically, the magnetic field acquiring section 820 may be formed using a flip-flop or the like that latches at a prescribed timing T to acquire the digital measurement data (Vx, Vy, and Vz) that was digitally converted by the AD converter 810.

Each calibration computing section 830 is connected to the corresponding magnetic field acquiring section 820, and calibrates the measurement data acquired by the magnetic field acquiring section 820, using a calibration parameter. The basics of the measurement data calibration performed by the calibration computing section 830 are as described below. Here, B (Bx, By, and Bz) represents the magnetic field input to the magnetic sensor cell 220 at a position [i, j, k], and V (Vx, Vy, and Vz) represents the detection results of the three-axis magnetic sensor obtained by the sensor sections 300x, 300y, and 300z. In this case, with a matrix S representing the magnetic sensor characteristics of the three-axis magnetic sensor, the detection result V of the three-axis magnetic sensor can be calculated as shown in the expression below.

$$\begin{pmatrix} Vx \\ Vy \\ Vz \end{pmatrix} = S\begin{pmatrix} Bx \\ By \\ Bz \end{pmatrix} + \begin{pmatrix} Vos, x \\ Vos, y \\ Vos, z \end{pmatrix} = \begin{pmatrix} Sxx & Sxy & Sxz \\ Syx & Syy & Syz \\ Szx & Szy & Szz \end{pmatrix}\begin{pmatrix} Bx \\ By \\ Bz \end{pmatrix} + \begin{pmatrix} Vos, x \\ Vos, y \\ Vos, z \end{pmatrix}$$

Expression 4

Here, Sxx, Syy, and Szz respectively represent the sensitivities (main-axis sensitivities) in the main-axis directions of the sensor sections 300x, 300y, and 300z, and Sxy, Sxz, Syx, Syz, Szx, and Szy respectively represent the sensitivities (cross-axis sensitivities) in the other-axis directions (also called cross-axis directions). Furthermore, (Vos, x), (Vos, y), and (Vos, z) respectively represent the offsets of the sensor sections 300x, 300y, and 300z. Here, the main-axis direction is the direction in which the sensor sections 300x, 300y, and 300z mainly perform measurement, and the cross-axis direction is a direction that is mostly not measured. In the measurement by the magnetic sensor, the main-axis direction is a direction (input-axis direction or sensitivity-axis direction) in which the magnetic sensor exhibits maximum sensitivity when the magnetic field is input thereto. And, the cross-axis direction is perpendicular to the main-axis direction. For example, when the sensor section 300x performs measurement in the X-axis direction, the main-axis direction is along the X-axis, and the cross-axis directions are the Y-axis direction and the Z-axis direction. The magnetic sensor 520 ideally has only the main-axis sensitivity, but sometimes has the cross-axis sensitivities due to processing or the like. And, these cross-axis sensitivities cause non-orthogonal errors in measurements. Furthermore, the magnetic sensors 520 also have the cross-axis sensitivities caused by interference therebetween.

Each sensor section 300 realizes linearity for the detection result with respect to the input magnetic field, within the range of the input magnetic field to be detected, and therefore each element in the matrix S is a substantially constant coefficient that is unrelated to the magnitude of the input magnetic field B. Furthermore, even though each sensor section 300 has cross-axis sensitivities, as long as the detection result of the sensor section 300 has linearity, each element of the matrix S is a substantially constant coefficient that is unrelated to the magnitude of the input magnetic field B.

Accordingly, by using the offsets ((Vos, x), (Vos, y), and (Vos, z)) and the inverse matrix $S^-$ of the matrix S, the calibration computing section 830 can convert the measurement data (Vx, Vy, and Vz) into the magnetic field measurement data B (Bx, By, and Bz) indicating the originally input magnetic field. In other words, the calibration computing section 830 calibrates the digital measurement data from the magnetic field acquiring section 820, using the main-axis sensitivities, the cross-axis sensitivities, and the offsets. In this way, the calibration computing section 830 corrects the offsets, the sensitivities in the main-axis directions, and the sensitivities in the cross-axis directions. This conversion also occurs when the sensor sections 300x to 300z include the magnetic flux concentrators described above. This is because the magnetic sensor cells 220 are formed as three-axis magnetic sensors using the sensor sections 300x to 300z, and because it enables the conversion using linear algebra. The offset calibration may be omitted in a case where the measurement data V is an AC component, by including a high-pass filter or the like between the output of the sensor section 300 and the calibration computing section 830. In other words, the calibration computing section 830 may calibrate the digital measurement data V from the magnetic field acquiring section 820 using at least one of the main-axis sensitivities, the cross-axis sensitivities, and the offsets.

$$\begin{pmatrix} Bx \\ By \\ Bz \end{pmatrix} = S^{-1} \left\{ \begin{pmatrix} Vx \\ Vy \\ Vz \end{pmatrix} - \begin{pmatrix} Vos, x \\ Vos, y \\ Vos, z \end{pmatrix} \right\} \quad \text{Expression 5}$$

The calibration computing section 830 calculates the offsets ((Vos, x), (Vos, y), and (Vos, z)) and the inverse matrix $S^{-1}$ of the matrix S by using environmental magnetic field measurement data, converts the measurement data acquired by the magnetic field acquiring section 820 into the magnetic field measurement data B using these calibration parameters, and supplies the magnetic field measurement data B to the data output section 840.

Since each sensor section 300 realizes linearity as described above, the calibration computing section 830 can convert the measurement data into the magnetic field measurement data B using substantially constant coefficients. In other words, the substantially constant coefficients used by the calibration computing section 830 can be determined as a set of calibration parameters using the environmental magnetic field data.

Furthermore, there are cases where certain magnetic sensor cells 220 have different orientations than other magnetic sensor cells 220 within the same magnetic sensor array 210. Therefore, the calibration computing section 830 may further perform a computation to align the orientations of each of the magnetic sensor cells 220. In other words, the calibration computing section 830 may perform a computation to align the orientations among a plurality of magnetic sensor cells 220. As an example, with R representing an orientation conversion matrix for converting the orientations of magnetic sensor cells into the same orientation of the same coordinate system, the calibration computing section 830 may perform the orientation alignment using a computation such as described below.

$$\begin{pmatrix} Bx' \\ By' \\ Bz' \end{pmatrix} = R \cdot S^{-1} \left\{ \begin{pmatrix} Vx \\ Vy \\ Vz \end{pmatrix} - \begin{pmatrix} Vos, x \\ Vos, y \\ Vos, z \end{pmatrix} \right\} \quad \text{Expression 6}$$

In this way, the outputs of all of the magnetic sensor cells are treated as outputs of the same orientation in the same coordinate system, and therefore, when there is a uniform environmental magnetic field, the outputs of all of the magnetic sensor cells are the same, such that it is possible to cancel out the effect of a uniform environmental magnetic field in the computation of the gradient magnetic field described further below. The orientation of each magnetic sensor cell may be aligned with the orientation of a magnetic sensor cell serving as a reference. Alternatively, the orientation of each magnetic sensor cell may be aligned with the orientation of a case of the magnetic sensor array 210. An acceleration sensor may be further included in each magnetic sensor cell, and the orientation conversion matrix R may be calculated from the outputs of the acceleration sensors. Alternatively, the orientation conversion matrix may be calculated using the orthogonal conversion relationship between the outputs of the magnetic sensor cells. In other words, Da represents the measurement data matrix after the correction of Expression 5 has been performed for the output of a certain reference magnetic sensor cell 220, and Db represents the measurement data matrix after the correction of Expression 5 has been performed on the output of another magnetic sensor cell 220 that is a correction target when the same magnetic field is detected. At this time, there is an orthogonal conversion relationship between Da and Db, and this can be calculated in the following manner. The matrix $DaDb^T$, which is the product of the matrix Da and the transposed matrix of the matrix Db, is calculated, and singular-value decomposition is performed on this matrix $DaDb^T$ to calculate the two unitary matrices U and W. At this time, R can be calculated by the equation $R=UW^T$. Furthermore, the orientation conversion matrix R may be obtained by performing a calibration using a magnetic field that is already known. In this way, the calibration computing section 830 may correct the offsets of the measurement data, the sensitivities in the main-axis directions, the sensitivities in the cross-axis directions, and the orientations.

The data output section 840 supplies the gradient magnetic field computing section 850 with the magnetic field measurement data B that has been calibrated by the calibration computing section 830.

The gradient magnetic field computing section 850 calculates the gradient magnetic field using the magnetic field measurement data B supplied from the data output section 840, i.e. the magnetic field measurement data B in which the digital measurement data V has been calibrated. In the present embodiment, the gradient magnetic field computing section 850 calculates the gradient magnetic field in all three dimensions for the magnetic fields in all three axial directions. In this way, it is possible to obtain a more detailed gradient magnetic field distribution. Instead, the gradient magnetic field computing section 850 may calculate the gradient magnetic field for only the magnetic fields in some of the three axial directions. Furthermore, the gradient magnetic field computing section 850 may calculate the gradient magnetic field for only some of the directions among the three dimensional directions. In this way, it is possible to calculate only the necessary gradient magnetic field components, thereby reducing the load of the computation process performed by the gradient magnetic field computing section 850.

In the present embodiment, the three axial directions of the magnetic fields being detected are the same as the three dimensional directions in which the magnetic sensor cells 220 are arranged. Therefore, it is easy to understand each component of the gradient magnetic field in the diagram of the gradient magnetic field distribution shown further below. Instead, the three axial directions of the magnetic fields being detected may be different than the three dimensional directions in which the magnetic sensor cells 220 are arranged. If these directions are different, there are no restrictions on the arrangement of the sensor sections 300 within the magnetic sensor cells 220 and the arrangement directions of the magnetic sensor cells 220, and the degree of design freedom for the magnetic sensor array 210 can be increased.

The gradient magnetic field computing section 850 calculates the three-dimensional gradient magnetic field for the magnetic fields in all three axial directions, by calculating the difference between the magnetic fields of adjacent magnetic sensor cells 220 using the magnetic field measurement data measured between adjacent magnetic sensor cells 220 among the plurality of magnetic sensor cells 220, i.e. by calculating the difference between the pieces of magnetic field measurement data. The gradient magnetic field computing section 850 may calculate a gradient magnetic field of the second-order or higher using the magnetic field measurement data measured between a plurality of adjacent magnetic sensor cells 220.

Figure 9:
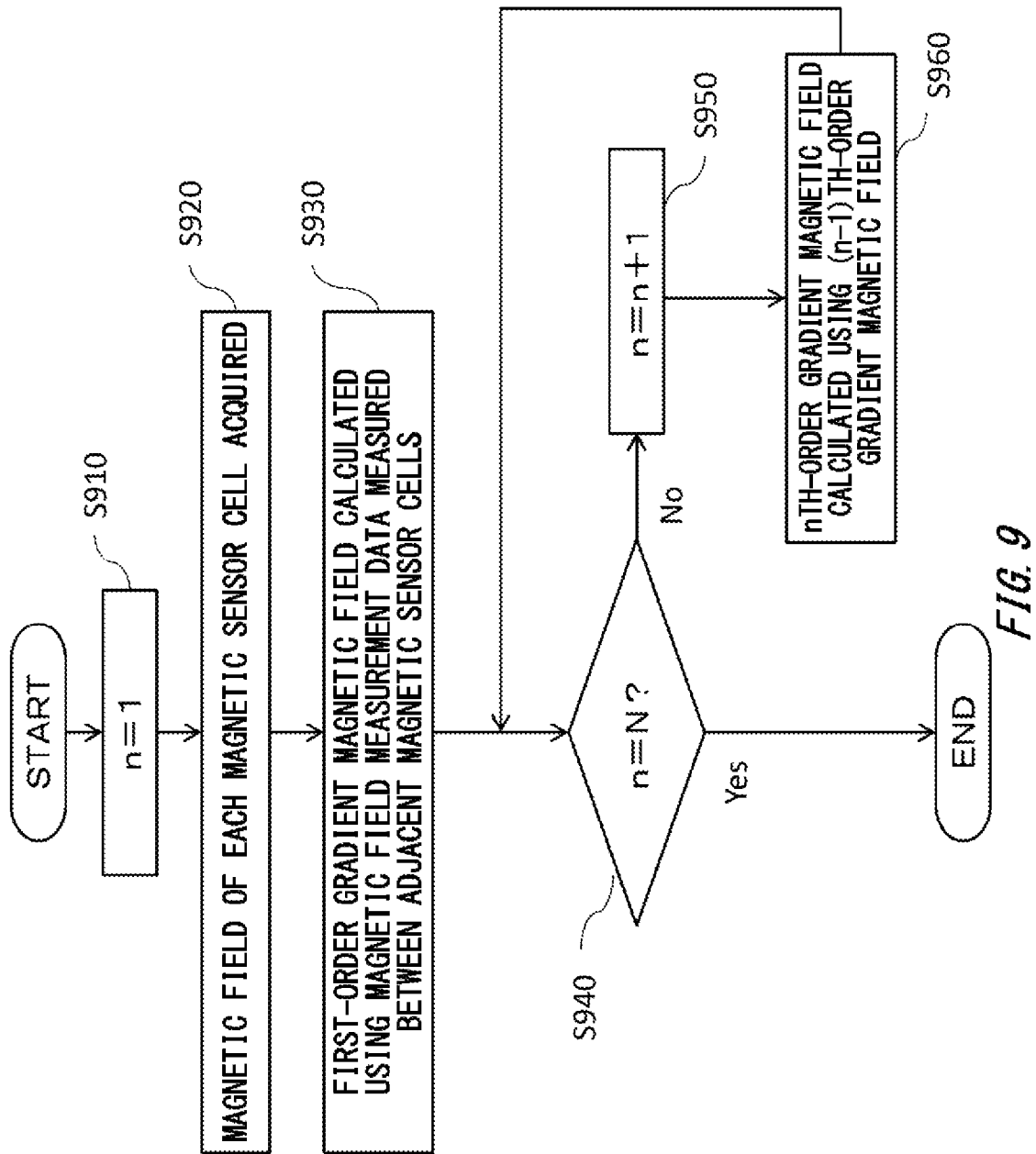
FIG. 9 shows a flow for calculating an Nth-order gradient magnetic field, according to the present embodiment.

FIG. 9 shows a flow for calculating an Nth-order gradient magnetic field. At step 910, the gradient magnetic field computing section 850 substitutes 1 for n. At step 920, the gradient magnetic field computing section 850 acquires the magnetic field measurement data measured by the magnetic sensor cells 220 at each of the positions. Here, the magnetic field measurement data measured by a magnetic sensor cell 220 at the position [i, j, k] is expressed as shown by Expression 7 below.

$$B^{i,j,k} = (B_x^{i,j,k}, B_y^{i,j,k}, B_z^{i,j,k}) \quad \text{Expression 7:}$$

At step 930, the gradient magnetic field computing section 850 calculates the first-order gradient magnetic field, by calculating the first-order difference between magnetic fields using the magnetic field measurement data between adjacent magnetic sensor cells 220 included in the magnetic sensor array 210. The gradient magnetic field computing section 850 calculates the first-order gradient magnetic field in the X-axis direction according to the expression shown below, using the magnetic field measurement data measured between the magnetic sensor cell 220 [i+1, j, k] and the magnetic sensor cell 220 [i, j, k].

$$\frac{B^{i+1,j,k} - B^{i,j,k}}{\Delta x} = \left( \frac{\Delta B_x^{i,j,k}}{\Delta x}, \frac{\Delta B_y^{i,j,k}}{\Delta x}, \frac{\Delta B_z^{i,j,k}}{\Delta x} \right)^T \quad \text{Expression 8}$$

In other words, the gradient magnetic field computing section 850 calculates the difference in the X-axis component of the magnetic field measurement data between the magnetic sensor cell 220 [i+1, j, k] and the magnetic sensor cell 220 [i, j, k] by subtracting the X-axis magnetic field measurement data $Bx^{i,j,k}$ of the magnetic sensor cell 220 [i, j, k] from the X-axis magnetic field measurement data $Bx^{i+1,j,k}$ of the magnetic sensor cell 220 [i+1, j, k], and divides the result of this subtraction by the distance $\Delta x$ between the magnetic sensor cell 220 [i+1, j, k] and the magnetic sensor cell 220 [i, j, k] to calculate the first-order gradient magnetic field in the X-axis direction for the X-axis component of the magnetic field measurement data at the position [i, j, k].

Similarly, the gradient magnetic field computing section 850 calculates the difference in the Y-axis component of the magnetic field measurement data between the magnetic sensor cell 220 [i+1, j, k] and the magnetic sensor cell 220 [i, j, k] by subtracting the Y-axis magnetic field measurement data $By^{i,j,k}$ of the magnetic sensor cell 220 [i, j, k] from the Y-axis magnetic field measurement data $By^{i+1,j,k}$ of the magnetic sensor cell 220 [i+1, j, k], and divides the result of this subtraction by the distance $\Delta x$ between the magnetic sensor cell 220 [i+1, j, k] and the magnetic sensor cell 220 [i, j, k] to calculate the first-order gradient magnetic field in the X-axis direction for the Y-axis component of the magnetic field measurement data at the position [i, j, k].

Similarly, the gradient magnetic field computing section 850 calculates the difference in the Z-axis component of the magnetic field measurement data between the magnetic sensor cell 220 [i+1, j, k] and the magnetic sensor cell 220 [i, j, k] by subtracting the Z-axis magnetic field measurement data $Bz^{i,j,k}$ of the magnetic sensor cell 220 [i, j, k] from the Z-axis magnetic field measurement data $Bz^{i+1,j,k}$ of the magnetic sensor cell 220 [i+1, j, k], and divides the result of this subtraction by the distance $\Delta x$ between the magnetic sensor cell 220 [i+1, j, k] and the magnetic sensor cell 220 [i, j, k] to calculate the first-order gradient magnetic field in the X-axis direction for the Z-axis component of the magnetic field measurement data at the position [i, j, k].

Furthermore, the gradient magnetic field computing section 850 calculates the first-order gradient magnetic field in the Y-axis direction according to the following expression, using the magnetic field measurement data measured between the magnetic sensor cell 220 [i, j+1, k] and the magnetic sensor cell 220 [i, j, k], in the same manner as the calculation of the first-order gradient magnetic field in the X-axis direction.

$$\frac{B^{i,j+1,k} - B^{i,j,k}}{\Delta y} = \left( \frac{\Delta B_x^{i,j,k}}{\Delta y}, \frac{\Delta B_y^{i,j,k}}{\Delta y}, \frac{\Delta B_z^{i,j,k}}{\Delta y} \right)^T \quad \text{Expression 9}$$

Yet further, the gradient magnetic field computing section 850 calculates the first-order gradient magnetic field in the Z-axis direction according to the following expression, using the magnetic field measurement data measured between the magnetic sensor cell 220 [i, j, k+1] and the magnetic sensor cell 220 [i, j, k], in the same manner as the calculation of the first-order gradient magnetic field in the X-axis direction.

$$\frac{B^{i,j,k+1} - B^{i,j,k}}{\Delta z} = \left(\frac{\Delta B_x^{i,j,k}}{\Delta z}, \frac{\Delta B_y^{i,j,k}}{\Delta z}, \frac{\Delta B_z^{i,j,k}}{\Delta z}\right)^T \quad \text{Expression 10}$$

According to the computations of Expressions 8 to 10, the gradient magnetic field computing section 850 can obtain the first-order gradient magnetic field shown below in Expression 11 in the three dimensional directions for the magnetic field measurement data on three axes. In other words, the gradient magnetic field computing section 850 can obtain the gradient magnetic field in all of the three dimensional directions for the magnetic fields in all three axial directions. The gradient magnetic field computing section 850 may calculate the first-order gradient magnetic field in units of the distance $\Delta x = \Delta y = \Delta z$ between magnetic sensor cells 220. In this case, the gradient magnetic field computing section 850 can treat the difference between pieces of magnetic field measurement data as the first-order gradient magnetic field.

$$\begin{bmatrix} \frac{\Delta B_x^{i,j,k}}{\Delta x} & \frac{\Delta B_x^{i,j,k}}{\Delta y} & \frac{\Delta B_x^{i,j,k}}{\Delta z} \\ \frac{\Delta B_y^{i,j,k}}{\Delta x} & \frac{\Delta B_y^{i,j,k}}{\Delta y} & \frac{\Delta B_y^{i,j,k}}{\Delta z} \\ \frac{\Delta B_z^{i,j,k}}{\Delta x} & \frac{\Delta B_z^{i,j,k}}{\Delta y} & \frac{\Delta B_z^{i,j,k}}{\Delta z} \end{bmatrix} \quad \text{Expression 11}$$

At step 940, the gradient magnetic field computing section 850 determines whether n is equal to N. If n is equal to N, the gradient magnetic field computing section 850 ends the process. At step 940, if n is not equal to N, the gradient magnetic field computing section 850 moves the process to step 950, and increments n by 1. The gradient magnetic field computing section 850 then moves the process to step 960.

At step 960, the gradient magnetic field computing section 850 calculates the nth-order gradient magnetic field using the (n−1)th-order gradient magnetic field. As an example, at step 930 before the calculation of the second-order gradient magnetic field, the gradient magnetic field computing section 850 has already calculated the first-order gradient magnetic field at the position [i+1, j, k] according to the following expression, using Expression 8 and the magnetic field measurement data measured between the magnetic sensor cell 220 [i+2, j, k] and the magnetic sensor cell 220 [i+1, j, k] as the first-order gradient magnetic field in the X-axis direction.

$$\frac{B^{i+2,j,k} - B^{i+1,j,k}}{\Delta x} = \left(\frac{\Delta B_x^{i+1,j,k}}{\Delta x}, \frac{\Delta B_y^{i+1,j,k}}{\Delta x}, \frac{\Delta B_z^{i+1,j,k}}{\Delta x}\right)^T \quad \text{Expression 12}$$

Then, at step 960, when calculating the second-order gradient magnetic field, the gradient magnetic field computing section 850 calculates the second-order gradient magnetic field in the X-axis direction according to the following expression, using the first-order gradient magnetic field calculated using Expression 8 and Expression 12.

$$\frac{\frac{B^{i+2,j,k} - B^{i+1,j,k}}{\Delta x} - \frac{B^{i+1,j,k} - B^{i,j,k}}{\Delta x}}{\Delta x} = \left(\frac{\Delta^2 B_x^{i,j,k}}{\Delta x^2}, \frac{\Delta^2 B_y^{i,j,k}}{\Delta x^2}, \frac{\Delta^2 B_z^{i,j,k}}{\Delta x^2}\right)^T \quad \text{Expression 13}$$

In other words, the gradient magnetic field computing section 850 calculates the second-order gradient magnetic field in the X-axis direction by subtracting the first-order gradient magnetic field in the X-axis direction at the position [i, j, k] from the first-order gradient magnetic field in the X-axis direction at the position [i+1, j, k] and dividing the result of the subtraction by the distance $\Delta X$ between the adjacent magnetic sensor cells 220 in the X-axis direction.

The gradient magnetic field computing section 850 can calculate the second-order gradient magnetic fields in the Y-axis direction and the Z-axis direction in the same manner as the second-order gradient magnetic field in the X-axis direction. Next, the gradient magnetic field computing section 850 returns the process to step 940, and repeats the subsequent processes. In this way, the gradient magnetic field computing section 850 can acquire the nth-order gradient magnetic fields in the three dimensional directions for the magnetic field measurement data on three axes, using the magnetic field measurement data measured between adjacent magnetic sensor cells 220.

Here, if N=1, the gradient magnetic field computing section 850 can express the first-order gradient magnetic field provided by Expression 11 obtained from step 930, as shown in the expression below, if $\Delta x = \Delta y = \Delta z$ is small enough $$\begin{bmatrix} \frac{\partial B_x^{i,j,k}}{\partial x} & \frac{\partial B_x^{i,j,k}}{\partial y} & \frac{\partial B_x^{i,j,k}}{\partial z} \\ \frac{\partial B_y^{i,j,k}}{\partial x} & \frac{\partial B_y^{i,j,k}}{\partial y} & \frac{\partial B_y^{i,j,k}}{\partial z} \\ \frac{\partial B_z^{i,j,k}}{\partial x} & \frac{\partial B_z^{i,j,k}}{\partial y} & \frac{\partial B_z^{i,j,k}}{\partial z} \end{bmatrix} \quad \text{Expression 14}$$

If N=2, the gradient magnetic field computing section 850 acquires the second-order gradient magnetic field shown below, using the first-order gradient magnetic field and the flow shown in the present drawing.

$$\begin{bmatrix} \frac{\partial^2 B_x^{i,j,k}}{\partial x^2} & \frac{\partial^2 B_x^{i,j,k}}{\partial y^2} & \frac{\partial^2 B_x^{i,j,k}}{\partial z^2} \\ \frac{\partial^2 B_y^{i,j,k}}{\partial x^2} & \frac{\partial^2 B_y^{i,j,k}}{\partial y^2} & \frac{\partial^2 B_y^{i,j,k}}{\partial z^2} \\ \frac{\partial^2 B_z^{i,j,k}}{\partial x^2} & \frac{\partial^2 B_z^{i,j,k}}{\partial y^2} & \frac{\partial^2 B_z^{i,j,k}}{\partial z^2} \end{bmatrix} \quad \text{Expression 15}$$

If N is greater than 2, the gradient magnetic field computing section 850 acquires the nth-order gradient magnetic field shown below, using the first-order and second-order gradient magnetic fields and the flow shown in the present drawing.

$$\begin{bmatrix} \dfrac{\partial^n B_x^{i,j,k}}{\partial x^n} & \dfrac{\partial^n B_x^{i,j,k}}{\partial y^n} & \dfrac{\partial^n B_x^{i,j,k}}{\partial z^n} \\ \dfrac{\partial^n B_y^{i,j,k}}{\partial x^n} & \dfrac{\partial^n B_y^{i,j,k}}{\partial y^n} & \dfrac{\partial^n B_y^{i,j,k}}{\partial z^n} \\ \dfrac{\partial^n B_z^{i,j,k}}{\partial x^n} & \dfrac{\partial^n B_z^{i,j,k}}{\partial y^n} & \dfrac{\partial^n B_z^{i,j,k}}{\partial z^n} \end{bmatrix}$$ Expression 16

Here, in a conventional Z-axis SQUID gradiometric array shown in Patent Document 1, it is impossible to acquire the ∂Bx/∂x, ∂Bx/∂y, ∂Bx/∂z, ∂By/∂x, ∂By/∂y, and ∂By/∂z components. Furthermore, with the conventional X-Y-axis SQUID gradiometric array shown in Patent Document 1, it is impossible to acquire the ∂Bx/∂z, ∂By/∂z, ∂Bz/∂x, ∂Bz/∂y, and ∂Bz/∂z components. In contrast to this, according to the magnetic field measurement apparatus 10 of the present embodiment, as shown in Expressions 14, 15, and 16, it is possible to obtain the gradient magnetic fields in the three dimensional directions for the magnetic field measurement data on three axes, without missing any components. Furthermore, according to the magnetic field measurement apparatus 10 of the present embodiment, the computation is performed from the magnetic fields between adjacent magnetic sensor cells 220, and therefore it is possible to obtain not only the second-order and higher gradient magnetic fields in only the X-axis direction, Y-axis direction, and Z-axis direction, but also to obtain the gradient magnetic field components corresponding to a format that is partially differentiated in different axial directions, such as the ∂²B/∂x∂y, ∂²B/∂y∂z, and ∂²B/∂z∂x components.

Furthermore, according to the magnetic field measurement apparatus 10 of the present embodiment, it is possible to acquire the gradient magnetic fields in the three dimensional directions without missing any components, and therefore, for the heart magnetism measurement, for example, it is possible to simultaneously implement a measurement using tangent components and a measurement using normal components. As an example, as shown in FIG. 1, a vector arrow diagram is created using the gradient magnetic fields of the tangent components (∂Bx/∂z and ∂By/∂z), for example, in the XY plane parallel to the change of the person. As another example, a vector arrow diagram is created using the gradient magnetic fields of the normal components (∂Bz/∂x and ∂Bz/∂y). Here, the vector arrow diagram is also referred to as a current arrow diagram, and is obtained according to the following expression when using the representative gradient magnetic fields of the normal components (∂Bx/∂z and ∂By/∂z).

$$I_{xy} = \dfrac{\partial B_z}{\partial y} e_x - \dfrac{\partial B_z}{\partial x} e_y$$ Expression 17

Here, ex and ey are unit vectors in the X direction and the Y direction. When using the tangent components, (∂Bz/∂z and ∂By/∂z) may be replaced with (−∂Bz/∂x and −∂Bz/∂y). The above assumes that the magnetic field source is projected onto the XY plane, but according to the magnetic field measurement apparatus 10 of the present embodiment, this projection can be expanded three-dimensionally. In other words, it is possible to create a vector arrow diagram projected onto the YZ plane and the XZ plane. Accordingly, the gradient magnetic field computing section 850 may further compute and output a two-dimensional vector arrow diagram or a three-dimensional vector arrow diagram (vector arrow diagram in the XY plane, the YZ plane, and the XZ plane). According to the magnetic field measurement apparatus 10 of the present embodiment, each sensor section 300 of the magnetic sensor 520 realizes linearity and can widen the input range of the magnetic field, and therefore by setting the magnetic field measurement data of each magnetic sensor cell as output (in the same orientation) in the same coordinate system using the calibration computing section 830, it is possible to calculate the gradient magnetic fields in which uniform magnetic fields are cancelled out in the computation performed by the gradient magnetic field computing section 850. Accordingly, the magnetic field measurement apparatus 10 of the present embodiment enables the usage of a gradient magnetic field computation even in an environment where there is geomagnetism and no shield room.

Figure 10:
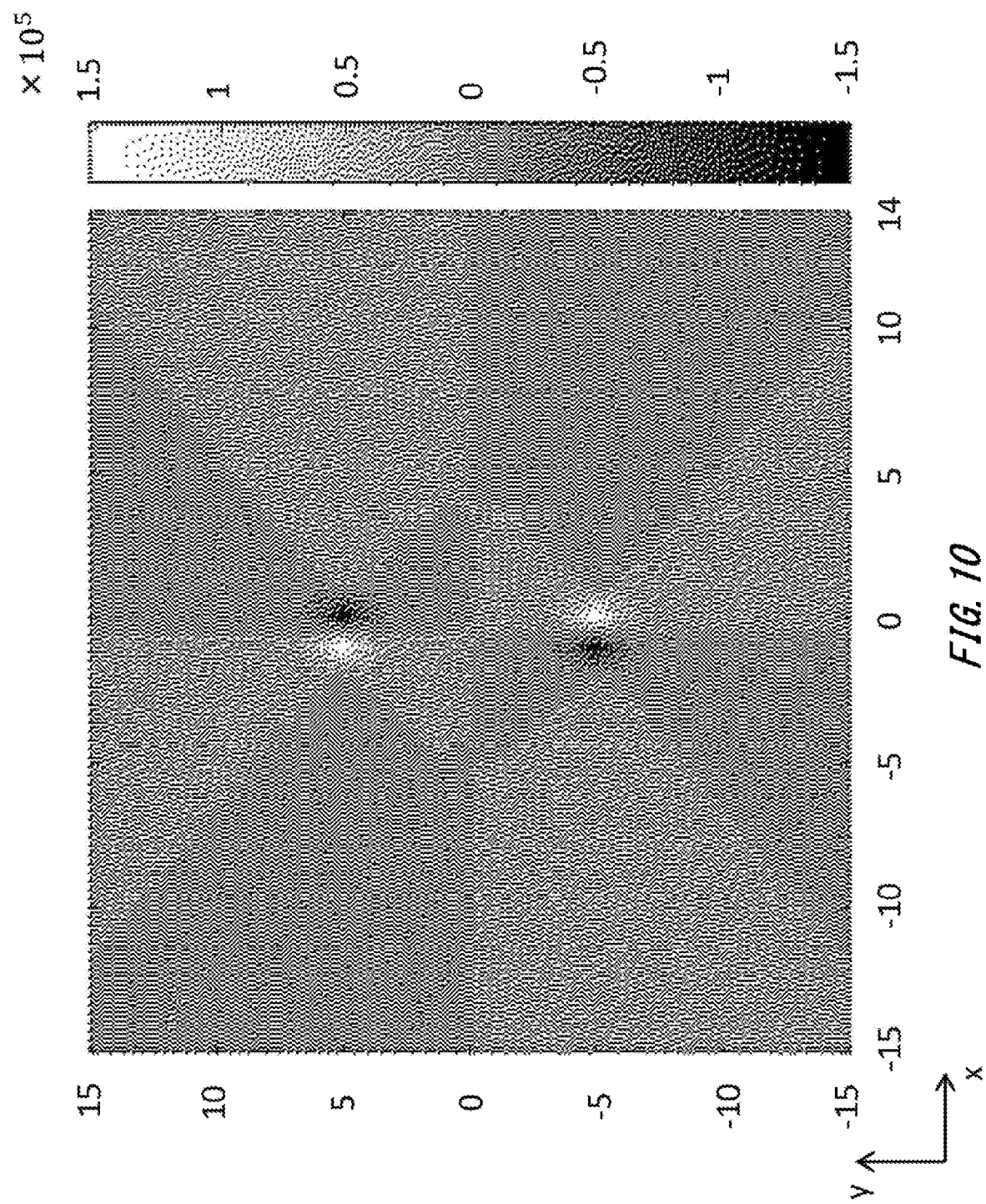
FIG. 10 shows an example of a first-order gradient magnetic field distribution obtained by the magnetic field measurement apparatus 10 according to the present embodiment.
Figure 11:
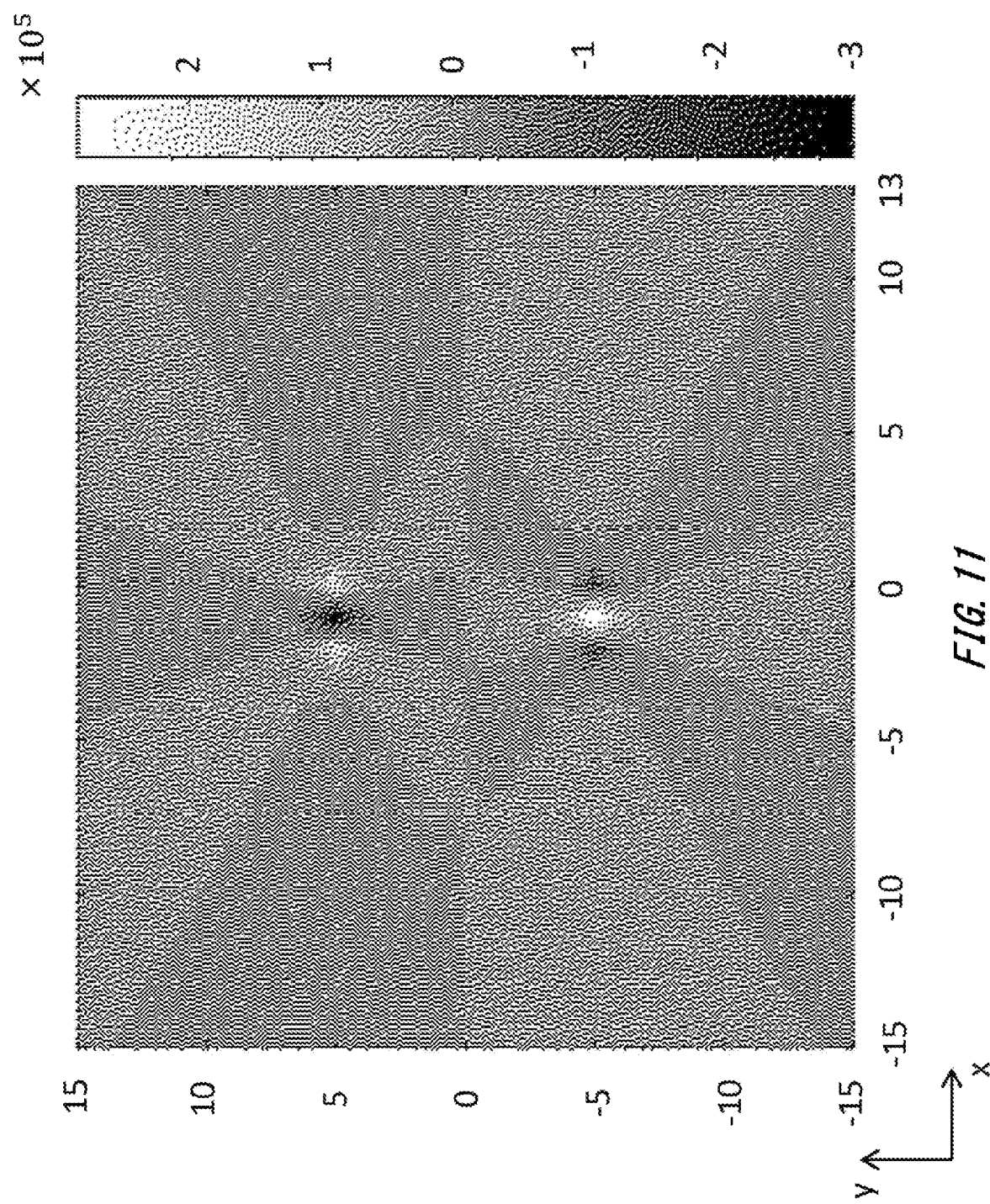
FIG. 11 shows an example of a second-order gradient magnetic field distribution obtained by the magnetic field measurement apparatus 10 according to the present embodiment.

FIG. 10 shows an example of a first-order gradient magnetic field distribution obtained by the magnetic field measurement apparatus 10 according to the present embodiment. FIG. 11 shows an example of a second-order gradient magnetic field distribution obtained by the magnetic field measurement apparatus 10 according to the present embodiment. These drawings show gradient magnetic field distributions in which a magnet with dimensions of X=5 mm, Y=0.5 mm, and Z=0.5 mm is arranged at the position (X, Y)=(0, −5 cm) with its N pole facing in the positive X-axis direction, a magnet with dimensions of X=5 mm, Y=0.5 mm, and Z=0.5 mm is arranged at the position (X, Y)=(0, 5 cm) with its N pole facing in the negative X-axis direction, and a plane that is 30 cm×30 cm, with grid points at 1 cm intervals, is measured by the magnetic field measurement apparatus 10 at a height of Z=1 cm from the plane in which the magnets are placed. In these drawings, the dot density at each coordinate indicates the gradient magnetic field in arbitrary units, and a lower dot density indicates a larger gradient magnetic field. FIG. 10 shows the ∂Bx/∂x component in the first-order gradient magnetic field distribution obtained under these conditions, and FIG. 11 shows the ∂²Bx/∂x² component in the second-order gradient magnetic field distribution obtained under these conditions.

As shown in FIGS. 10 and 11, according to the magnetic field measurement apparatus 10 of the present embodiment, it is possible to obtain a gradient magnetic field distribution in which the calculated gradient magnetic field is visible. In the present drawings, only examples of the ∂Bx/∂x component in the first-order gradient magnetic field distribution and the ∂²Bx/∂x² component in the second-order gradient magnetic field distribution are shown, but the magnetic field measurement apparatus 10 can obtain similar gradient magnetic field distributions for other gradient components and for third-order or higher gradient magnetic fields.

Figure 12:
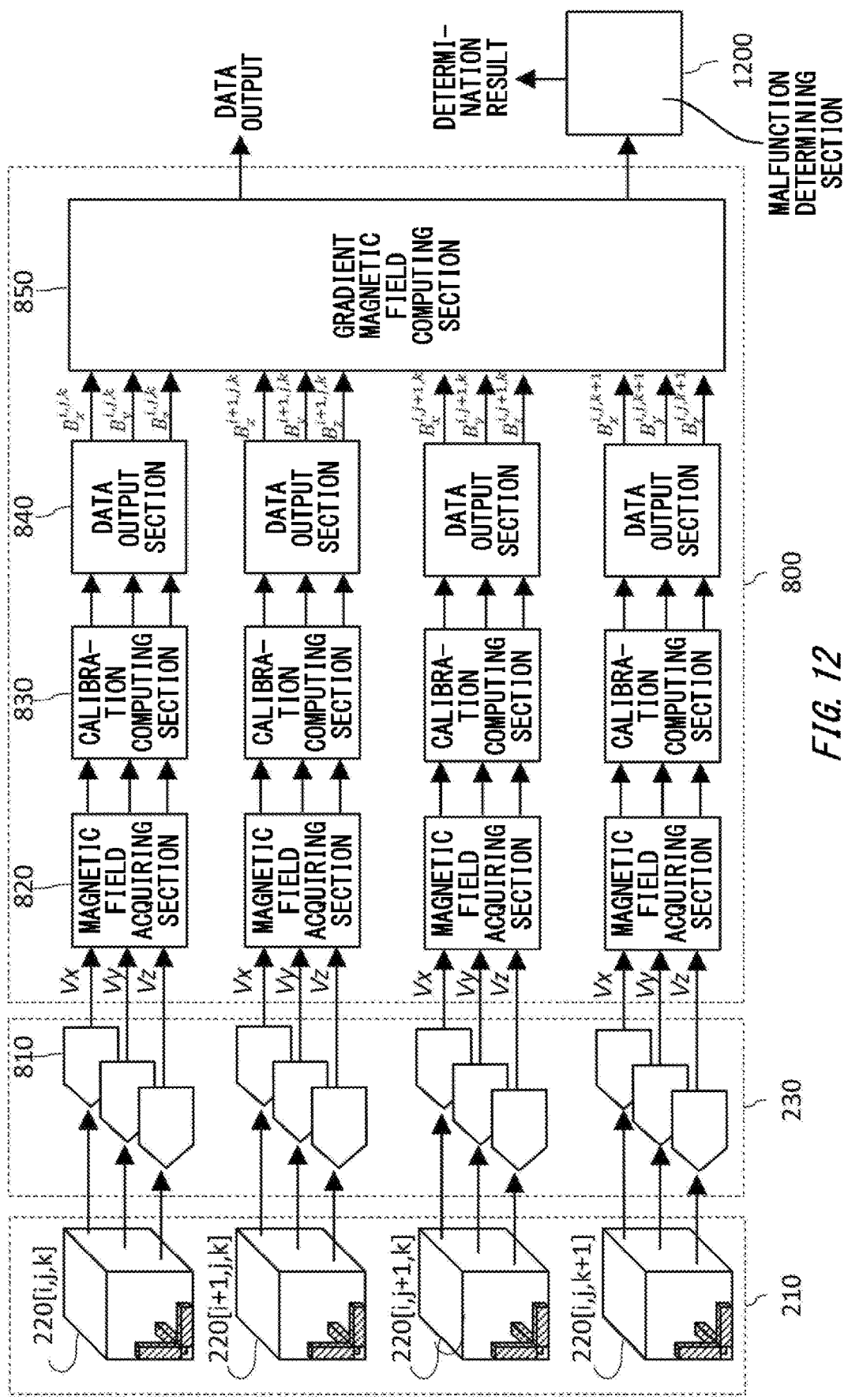
FIG. 12 shows a configuration of the magnetic sensor array 210, the sensor data collecting section 230, the sensor data processing section 800, and a malfunction determining section 1200 according to a modification of the magnetic field measurement apparatus 10.

FIG. 12 shows a configuration of the magnetic sensor array 210, the sensor data collecting section 230, the sensor data processing section 800, and a malfunction determining section 1200 according to a modification of the magnetic field measurement apparatus 10. In the present modification, the magnetic field measurement apparatus 10 further includes the malfunction determining section 1200. The malfunction determining section 1200 determines malfunctions of the magnetic sensor array 210, based on the gradient magnetic fields calculated by the gradient magnetic field computing section 850.

Figure 13:
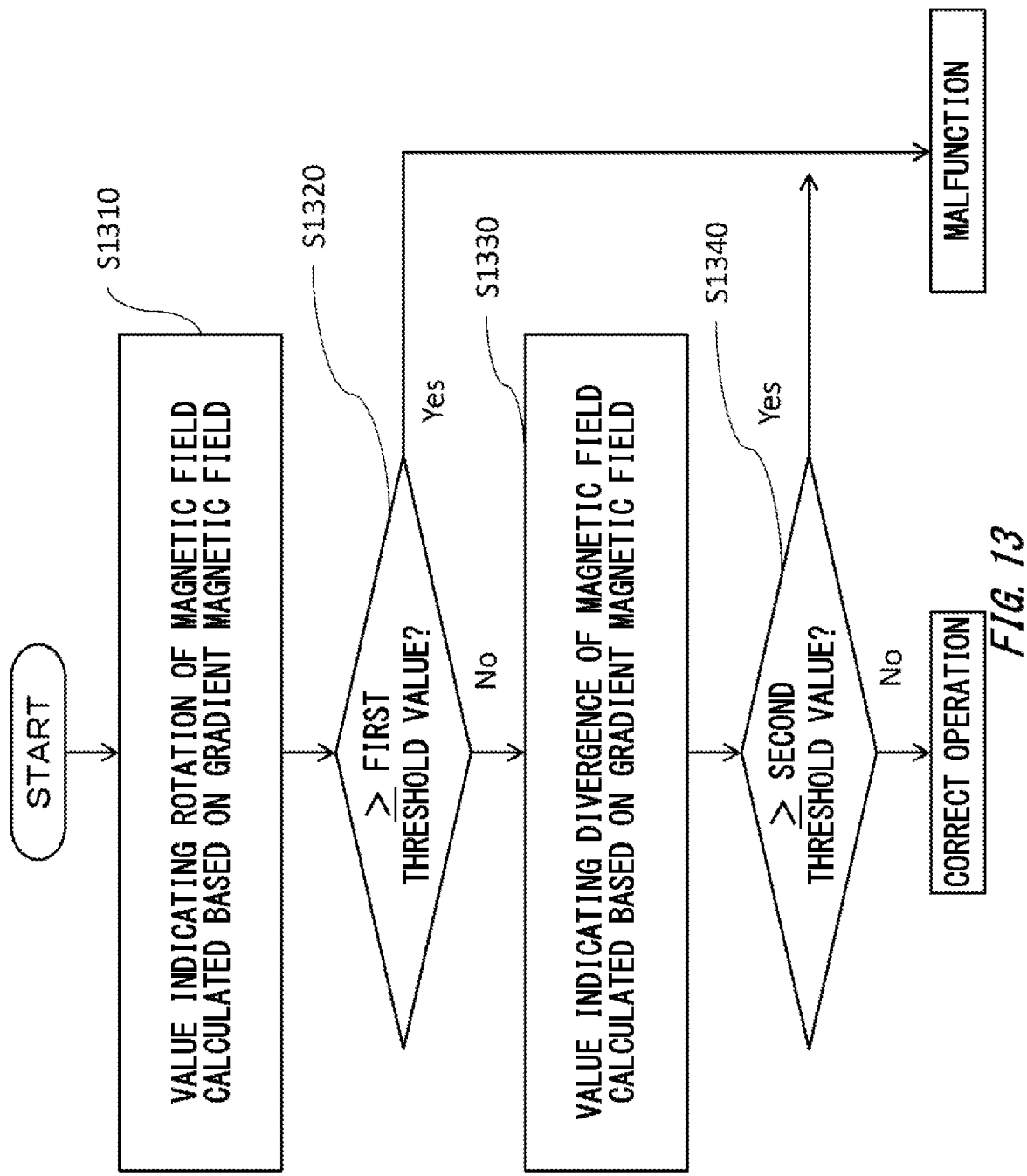
FIG. 13 shows a malfunction determination flow according to the present embodiment.

FIG. 13 shows a malfunction determination flow. At step 1310, the malfunction determining section 1200 calculates a value indicating the rotation of a magnetic field at a position of any magnetic sensor cell 220 among the plurality of magnetic sensor cells 220, based on the gradient magnetic field obtained from the process flow of FIG. 9, for example.

At step 1320, the malfunction determining section 1200 determines whether the calculated value indicating the rotation of the magnetic field is greater than or equal to a first threshold value. If the calculated value indicating the rotation of the magnetic field is greater than or equal to the first threshold value, the malfunction determining section 1200 determines that the magnetic sensor array 210 is malfunctioning.

The following describes this determination. If the determination is based on a vector analysis, when the magnetic field measured by the magnetic sensor cell 220 at the position id is provided by Expression 7, the rotation is expressed by a vector function in which the respective components are the difference between $\partial Bz^{i,\,j,\,k}/\partial y$ and $\partial By^{i,\,j,\,k}/\partial z$, the difference between $\partial Bx^{i,\,j,\,k}/\partial z$ and $\partial Bz^{i,\,j,\,k}/\partial X$, and the difference between $\partial By^{i,\,j,\,k}/\partial X$ and $\partial Bx^{i,\,j,\,k}/\partial y$, as shown in the following expression.

$$rot\ B^{i,j,k} = \left( \frac{\partial B_z^{i,j,k}}{\partial y} - \frac{\partial B_y^{i,j,k}}{\partial z},\ \frac{\partial B_x^{i,j,k}}{\partial z} - \frac{\partial B_z^{i,j,k}}{\partial x},\ \frac{\partial B_y^{i,j,k}}{\partial x} - \frac{\partial B_x^{i,j,k}}{\partial y} \right) \quad \text{Expression 18}$$

Here, the generation of the magnetic field occurs due to the current and the change over time of the electrical field based on a Maxwell equation. However, there is no current source in the magnetic sensor array 210. Therefore, the rotation of the magnetic field at the position id is 0, i.e. rot B=0. In other words, each component in the vector function shown by Expression 18 becomes 0 in theory.

Accordingly, the malfunction determining section 1200 can obtain the difference between $\partial Bz^{i,\,j,\,k}/\partial y$ and $\partial By^{i,\,j,\,k}/\partial z$, the difference between $\partial Bx^{i,\,j,\,k}/\partial z$ and $\partial Bz^{i,\,j,\,k}/\partial x$, and the difference between $\partial By^{i,\,j,\,k}/\partial x$ and $\partial Bx^{i,\,j,\,k}/\partial y$ from the differences between the symmetric components of the gradient magnetic fields shown in Expression 14, for example, set the absolute values of the differences between these symmetric components to be the values indicating the rotation of the magnetic field at the position [i, j, k], and determine that the magnetic sensor array 210 is malfunctioning if any of these values is significantly far from 0, i.e. if any of these values is greater than or equal to the first threshold value.

In the above description, a case is described in which the magnetic sensor array 210 is determined to be malfunctioning if any one of the components in the vector function shown in Expression 18 is significantly far from 0, but instead, the malfunction determining section 1200 may determine that the magnetic sensor array 210 is malfunctioning if the magnitude of the vector function shown in Expression 18 is significantly far from 0. In this case, the malfunction determining section 1200 sets the square root of the total sum of the square of the difference between $\partial Bz^{i,\,j,\,k}/\partial y$ and $\partial By^{i,\,j,\,k}/\partial z$, the square of the difference between $\partial Bx^{i,\,j,\,k}/\partial Z$ and $\partial Bz^{i,\,j,\,k}/\partial x$, and the square of the difference between $\partial By^{i,\,j,\,k}/\partial x$ and $\partial Bx^{i,\,j,\,k}/\partial y$ as a value indicating the rotation of the magnetic field at the position [i, j, k], and determines that the magnetic sensor array 210 is malfunctioning if this value is significantly far from 0, i.e. if this value is greater than or equal to the first threshold value.

At step 1320, if the value indicating the rotation of the magnetic field is less than the first threshold value, the malfunction determining section 1200 moves the process to step 1330. At step 1330, the malfunction determining section 1200 calculates a value indicating the divergence of the magnetic field at the position of any magnetic sensor cell 220 among the plurality of magnetic sensor cells 220, based on the gradient magnetic field obtained from the process flow of FIG. 9, for example.

At step 1340, the malfunction determining section 1200 determines whether the calculated value indicating the divergence of the magnetic field is greater than or equal to a second threshold value. The malfunction determining section 1200 determines that the magnetic sensor array 210 is malfunctioning if the calculated value indicating the divergence of the magnetic field is greater than or equal to the second threshold value.

The following describes this determination. If the determination is based on a vector analysis, when the magnetic field measured by the magnetic sensor cell 220 at the position [i, j, k] is provided by Expression 7, the divergence is expressed by a scalar function that is the sum of $\partial Bx^{i,\,j,\,k}/\partial X$, $\partial By^{i,\,j,\,k}/\partial y$, and $\partial Bz^{i,\,j,\,k}/\partial z$.

$$div\ B^{i,j,k} = \frac{\partial B_x^{i,j,k}}{\partial x} + \frac{\partial B_y^{i,j,k}}{\partial y} + \frac{\partial B_z^{i,j,k}}{\partial z} \quad \text{Expression 19}$$

Here, the magnetic force lines are certain to become closed curve lines based on a Maxwell equation. Therefore, the divergence of the magnetic field at the position [i, j, k] is 0, i.e. div B=0. In other words, value of the scalar function shown by Expression 19 becomes 0 in theory.

Accordingly, the malfunction determining section 1200 can obtain the sum of $\partial Bx^{i,\,j,\,k}/\partial X$, $\partial By^{i,\,j,\,k}/\partial y$, and $\partial Bz^{i,\,j,\,k}/\partial z$ from the diagonal components shown in Expression 14, for example, set the absolute value of the sum of these diagonal components to be the value indicating the divergence of the magnetic field at the position j, and determine that the magnetic sensor array 210 is malfunctioning if this value is significantly far from 0, i.e. if this value is greater than or equal to the second threshold value.

At step 1340, if the value indicating the divergence of the magnetic field is less than the second threshold value, the magnetic sensor array 210 is determined to be operating correctly. In this way, by acquiring the gradient magnetic field in the three dimensional directions for the magnetic field measurement data on three axes without missing any components, it is possible to detect whether the magnetic sensor array 210 is malfunctioning using this gradient magnetic field. Furthermore, it is possible to identify the position in the magnetic sensor array 210 where the malfunction occurred, based on the position of the gradient magnetic field used for performing the malfunction determination.

Figure 14:
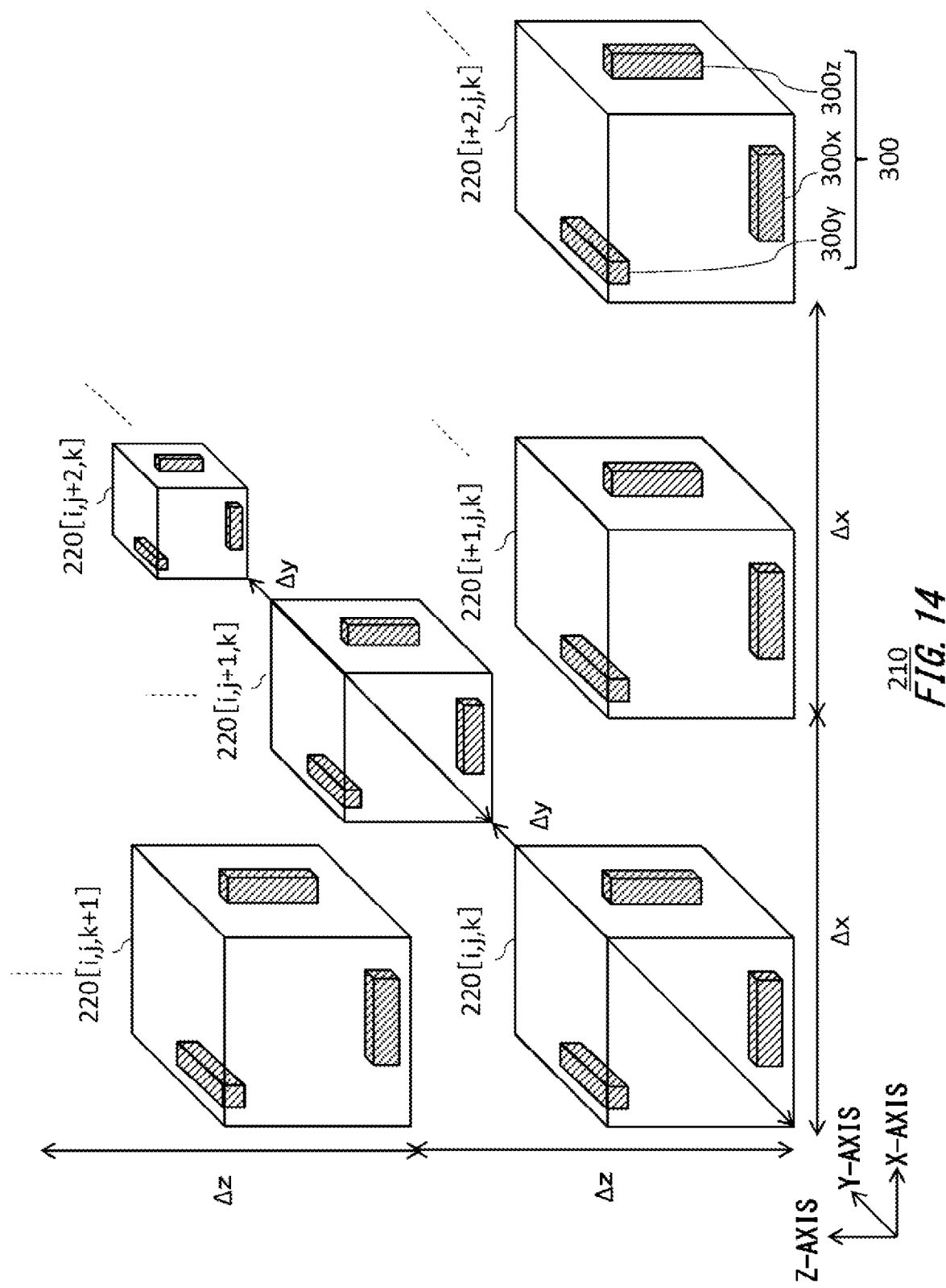
FIG. 14 shows a modification of the magnetic sensor cells 220 in the magnetic sensor array 210 according to the present embodiment.

FIG. 14 shows a modification of the magnetic sensor array 210 according to the present embodiment. In FIG. 14, the components that have the same function and configuration as in FIG. 3 are given the same reference numerals, and only differing points are included in the following description. In the present drawing, each of the plurality of magnetic sensor cells 220 in the magnetic sensor array 210 is provided with the sensor sections 300x, 300y, and 300z without being provided with the gap in the corner thereof. In this way, even when the sensor sections 300 are arranged in this manner, each magnetic sensor cell 220 can be arranged such that the sensor sections 300x, 300y, and 300z do not overlap when seen respectively from the three dimensional directions along the X-axis, Y-axis, and Z-axis. With such an arrangement, the plurality of sensor sections 300x, 300y, and 300z can be arranged in a dispersed manner within the magnetic sensor cell 220, and it is possible to prevent an arrangement in which the plurality of sensor sections 300$x$, 300$y$, and 300$z$ are gathered in one corner. The magnetic field measurement apparatus 10 of the present embodiment may acquire the measurement data using the magnetic sensor array 210 in which the sensor sections 300 are arranged in this manner.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable medium may be a tangible device that can store instructions to be executed by a suitable device, and as a result, a computer-readable medium having instructions stored thereon is a product that includes instructions that can be executed in order to create the means for executing the operations designated by flow charts and block diagrams. Examples of the computer-readable medium may include an electronic storage device, a magnetic storage device, an optical storage device, an electromagnetic storage medium, a magnetic storage medium, an optical storage medium, an electromagnetic storage medium, a semiconductor storage medium, and the like. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disk (DVD), a Blu-ray (Registered Trademark) disk, a memory stick, an integrated circuit card, or the like.

The computer-readable instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (Registered Trademark), C++ or the like, and conventional procedural programming languages, such as the "C" programming language or similar programming languages.

The computer-readable instructions may be provided to a processor or programmable circuitry of a general purpose computer, special purpose computer, or other programmable data processing apparatus to produce a machine, either locally, via a local area network (LAN), or via a wide area network (WAN) such as the Internet, and may be executed to create the means for performing the operations designated by the flow charts and block diagrams. Examples of the processor include a computer processor, a processing unit, a microprocessor, a digital signal processor, a controller, a microcontroller, and the like.

Figure 15:
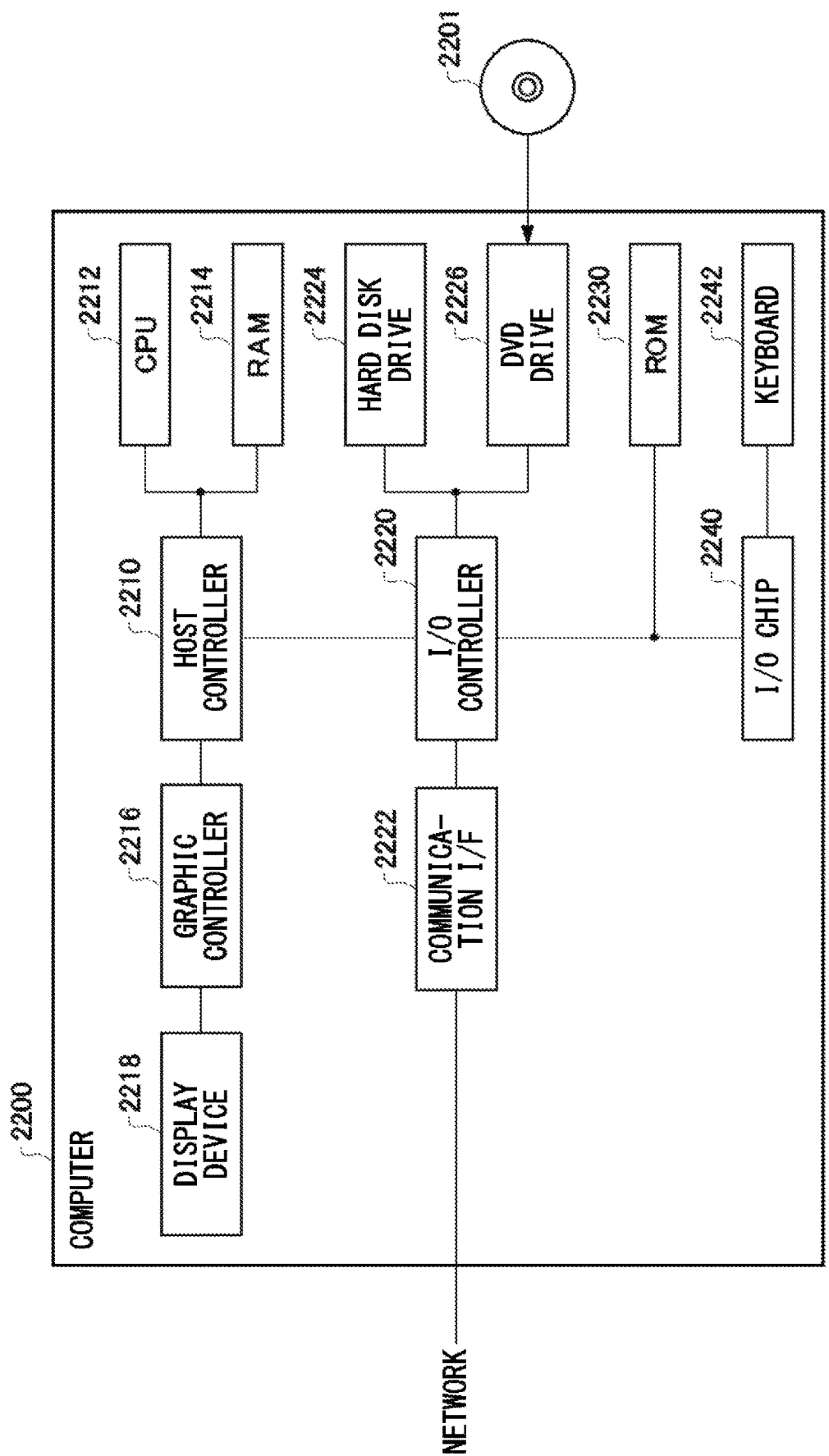
FIG. 15 shows an example of a computer 2200 in which aspects of the present invention may be wholly or partly embodied.

FIG. 15 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A magnetic field measurement apparatus comprising:
   a magnetic sensor array having a plurality of magnetic sensor cells capable of detecting magnetic fields in three axial directions arranged in three dimensions, each magnetic sensor cell including a plurality of magnetic sensors that each have a magnetoresistive element and a magnetic flux concentrator arranged at least at one of one end and another end of the magnetoresistive element;
   wherein
   the plurality of magnetic sensor cells each include a plurality of sensor sections that each include a respective magnetic sensor of the plurality of magnetic sensors, a coil, and an output section; wherein the coil is configured to generate a feedback magnetic field to reduce an input magnetic field detected by the magnetic sensor in the magnetic fields in a corresponding direction of a respective one of the three axial directions, and the output section is configured to output an output signal corresponding to a feedback current that is to flow in order for the coil to generate the feedback magnetic field;
   a plurality of AD converters that respectively convert analog detection signals output by the plurality of sensor sections into digital measurement data;
   a magnetic field acquiring section that acquires the digital measurement data;
   a calibration computing section that calibrates the digital measurement data from the magnetic field acquiring section by converting the digital measurement data into magnetic field measurement data, according to the expression $$\begin{pmatrix} Bx \\ By \\ Bz \end{pmatrix} = S^{-1} \left\{ \begin{pmatrix} Vx \\ Vy \\ Vz \end{pmatrix} - \begin{pmatrix} Vos, x \\ Vos, y \\ Vos, z \end{pmatrix} \right\}$$

where expressed in the three dimensions, (Bx, By, and Bz) represents the magnetic field measurement data, (Vx, Vy, and Vz) represents the digital measurement data, and (Vos, x, Vos, y, and Vos, z) represents an offset, and $S^{-1}$ is the inverse of a matrix S representing magnetic sensor characteristics of the plurality of sensor sections where the magnetic sensor characteristics of the plurality of sensor sections include main-axis sensitivities and cross-axis sensitivities; and a gradient magnetic field computing section that calculates a gradient magnetic field using the magnetic field measurement data resulting from the calibration of the digital measurement data, wherein the gradient magnetic field computing section is configured to calculate the gradient magnetic field in the three dimensions for the magnetic fields in all three axial directions, by calculating a difference in magnetic fields between adjacent magnetic sensor cells among the plurality of magnetic sensor cells, using the magnetic field measurement data measured between the adjacent magnetic sensor cells.

2. The magnetic field measurement apparatus according to claim 1, wherein
   the three axial directions and directions in which of the three dimensions the magnetic sensor cells are arranged are the same.

3. The magnetic field measurement apparatus according to claim 1, wherein
the gradient magnetic field is second-order or higher; and
the gradient magnetic field computing section is configured to calculate the gradient magnetic field that is second-order or higher, using the measurement data measured between a plurality of pairs of the adjacent magnetic sensor cells.

4. The magnetic field measurement, apparatus according to claim 1, wherein
the plurality of sensor sections are arranged in a manner to not overlap with each other when viewed from each of the three dimensional directions.

5. The magnetic field measurement apparatus according to claim 4, wherein
the plurality of sensor sections are each arranged such that one end is provided at a gap located between the plurality of sensor sections and another end extends away from the gap in a corresponding axial direction among the three axial directions.

6. The magnetic field measurement apparatus according to claim 1, further comprising:
a malfunction determining section that determines a malfunction of the magnetic sensor array, based on the gradient magnetic field calculated by the gradient magnetic field computing section.

7. The magnetic field measurement apparatus according to claim 6, wherein
the malfunction determining section is configured to calculate a value indicating rotation at a position of any magnetic sensor cell among the plurality of magnetic sensor cells in the magnetic fields in the three axial directions, based on the gradient magnetic field, and determines that the magnetic sensor array is malfunctioning if the value indicating the rotation of the detected magnetic fields is greater than or equal to a first threshold value.

8. The magnetic field measurement apparatus according to claim 6, wherein
the malfunction determining section is configured to calculate a value indicating divergence at a position of any magnetic sensor cell among the plurality of magnetic sensor cells in the magnetic fields in the three axial directions, based on the gradient magnetic field, and determines that the magnetic sensor array is malfunctioning if the value indicating the divergence of the detected magnetic fields is greater than or equal to a second threshold value.

9. The magnetic field measurement apparatus according to claim 1, wherein
the calibration computing section is configured to perform a computation to align orientations of the plurality of magnetic sensor cells.

10. A magnetic field measurement method for measuring a magnetic field with a magnetic field measurement apparatus, the magnetic field measurement method comprising:
converting, with the magnetic field measurement apparatus, analog detection signals output respectively by a plurality of sensor sections, in a magnetic sensor array having a plurality of magnetic sensor cells capable of detecting magnetic fields in three axial directions arranged in three dimensions, with each magnetic sensor cell including a plurality of magnetic sensors that each have a magnetoresistive element, a magnetic flux concentrator arranged at least at one of one end and another end of the magnetoresistive element, into digital measurement data, and the plurality of magnetic sensor cells each include the plurality of sensor sections that each include a respective magnetic sensor of the plurality of magnetic sensors, a coil, and an output section; wherein the coil is configured to generate a feedback magnetic field to reduce an input magnetic field detected by the magnetic sensor in the magnetic fields in a corresponding direction of a respective one of the three axial directions, and the output section is configured to output an output signal corresponding to a feedback current that is to flow in order for the coil to generate the feedback magnetic field;
acquiring the digital measurement data;
calibrating the digital measurement data by converting the digital measurement data into magnetic field measurement data, according to the expression $$\begin{pmatrix} Bx \\ By \\ Bz \end{pmatrix} = S^{-1} \left\{ \begin{pmatrix} Vx \\ Vy \\ Vz \end{pmatrix} - \begin{pmatrix} Vos, x \\ Vos, y \\ Vos, z \end{pmatrix} \right\}$$

where expressed in the three dimensions,
(Bx, By, and Bz) represents the magnetic field measurement data,
(Vx, Vy, and Vz) represents the digital measurement data, and
(Vos, x, Vos, y, and Vos, z) represents an offset, and
$S^{-1}$ is the inverse of a matrix S representing magnetic sensor characteristics of the plurality of sensor sections where the magnetic sensor characteristics of the plurality of sensor sections include main-axis sensitivities and cross-axis sensitivities; and
calculating a gradient magnetic field using the magnetic field measurement data resulting from the calibration of the digital measurement data, wherein
the calculating the gradient magnetic field includes calculating the gradient magnetic field in the three dimensions for the magnetic fields in all three axial directions, by calculating a difference in magnetic fields between adjacent magnetic sensor cells among the plurality of magnetic sensor cells, using the magnetic field measurement data measured between the adjacent magnetic sensor cells.

11. A non-transitory storage medium storing thereon a magnetic field measurement program that, when executed by a computer, causes the computer to:
convert analog detection signals output by a plurality of sensor sections into digital measurement data, a plurality of magnetic sensors being in a magnetic sensor array having a plurality of magnetic sensor cells capable of detecting magnetic fields in three axial directions arranged in three dimensions, each magnetic sensor cell including a plurality of the magnetic sensors that each have a magnetoresistive element, a magnetic flux concentrator arranged at least at one of one end and another end of the magnetoresistive element, and the plurality of magnetic sensor cells each include the plurality of sensor sections that each include a respective magnetic sensor of the plurality of magnetic sensors, a coil, and an output section; wherein the coil is configured to generate a feedback magnetic field to reduce an input magnetic field detected by the magnetic sensor in the magnetic fields in a corresponding direction of a respective one of the three axial directions, and the output section is configured to output an output signal corresponding to a feedback current that is to flow in order for the coil to generate the feedback magnetic field;

acquire the digital measurement data;

calibrate the digital measurement data by converting the digital measurement data into magnetic field measurement data, according to the expression $$\begin{pmatrix} Bx \\ By \\ Bz \end{pmatrix} = S^{-1} \left\{ \begin{pmatrix} Vx \\ Vy \\ Vz \end{pmatrix} - \begin{pmatrix} Vos, x \\ Vos, y \\ Vos, z \end{pmatrix} \right\}$$

where expressed in the three dimensions, (Bx, By, and Bz) represents the magnetic field measurement data, (Vv, Vy, and Vz) represents the digital measurement data, and (Vos, x, Vos, y, and Vos, z) represents an offset, and $S^{-1}$ is the inverse of a matrix S representing magnetic sensor characteristics of the plurality of sensor sections where the magnetic sensor characteristics of the plurality of sensor sections include main-axis sensitivities and cross-axis sensitivities; and calculate a gradient magnetic field using the magnetic field, measurement data resulting from the calibration of the digital measurement data, and also calculates the gradient magnetic field in the three dimensions for the magnetic fields in all three axial directions, by calculating a difference in magnetic fields between adjacent magnetic sensor cells among the plurality of magnetic sensor cells, using the magnetic field measurement data measured between the adjacent magnetic sensor cells.

* * * * *